United States Patent
Beck et al.

[11] Patent Number: 5,553,575
[45] Date of Patent: Sep. 10, 1996

[54] LAMBDA CONTROL BY SKIP FIRE OF UNTHROTTLED GAS FUELED ENGINES

[75] Inventors: Niels J. Beck, Bonita; Kresimir Gebert, San Diego; Hoi C. Wong, Carlsbad, all of Calif.

[73] Assignee: Servojet Products International, San Diego, Calif.

[21] Appl. No.: 491,275

[22] Filed: Jun. 16, 1995

[51] Int. Cl.⁶ .................................................. F02B 77/00
[52] U.S. Cl. ............................................... 123/198 F
[58] Field of Search ...................... 123/198 DB, 198 DC, 123/198 F, 1 A

[56] References Cited

U.S. PATENT DOCUMENTS

| | | | |
|---|---|---|---|
| Re. 33,270 | 7/1990 | Beck et al. | 123/447 |
| Re. 34,234 | 4/1993 | Kuroiwa et al. | 123/435 |
| 4,603,674 | 8/1986 | Tanaka | 123/575 |
| 4,831,993 | 5/1989 | Kelgard | 123/525 |
| 4,909,223 | 3/1990 | Ituzi et al. | 123/198 F |
| 5,363,648 | 11/1994 | Akazaki et al. | 123/703 |
| 5,370,097 | 12/1994 | Davis | 123/526 |
| 5,431,139 | 7/1995 | Grutter et al. | 123/198 F |
| 5,450,829 | 9/1995 | Beck | 123/435 |

OTHER PUBLICATIONS

"Optimized E.F.I. for Natural Gas Fueled Engines" SAE Technical Paper 911650, Aug. 1991 N. John Beck, W. P. Johnson and Peter W. Peterson.

"Cylinder Cutoff of 4-Stroke Cycle Engines at Part-Load and Idle" SAE Technical Paper 820156, Feb. 1982 Eiichi Watanabe and Itaru Fukutani.

"Dual Fuel Natural Gas/Diesel Engines: Technology, Performance, and Emissions" (940548), Jan. 1994 Christopher S. Weaver and Sean H. Turner.

"Improvement of Exhaust Emissions from a Two-Stroke Engine by Direct Injection System" (930497) Huei-Huay Huang, Ming-Horng Jeng, Nien-Tzu Chang, Yue-Yin Peng, James H. Wang and Wei-Li Chiang; Jan. 1993.

*Primary Examiner*—David A. Okonsky
*Attorney, Agent, or Firm*—Nilles & Nilles, S.C.

[57] ABSTRACT

The performance of a gas-fueled unthrottled internal combustion engine is improved by optimizing excess air ratio (lambda) in the engine. Lambda is optimized by selecting automatically and continuously the optimum fraction of cylinders firing (OFF) as a function of engine operating parameters, eliminating the fuel charge from one or more cylinders to obtain firing in the OFF, and distributing the unused fuel to the OFF, thereby decreasing lambda in the firing cylinders to an optimum level. OFF may be calculated according to mathematically derived and empirically weighted equations, or obtained with reference to suitable look-up tables. In addition, optimum lambda and OFF may be adjusted to take into account the effects of exhaust gas recirculation (egr), engine speed, and/or engine timing. Further lambda adjustment can be performed by suitable control of egr, ignition timing, and/or turbo air bypass (TAB).

34 Claims, 13 Drawing Sheets

LAMBDA CONTROL BY SKIP FIRE OF UNTHROTTLED GAS FUELED ENGINES

BACKGROUND OF THE INVENTION

1. Field of the Invention

The invention relates to the control of internal combustion engines and, more particularly, relates to a method and apparatus for optimizing, by skip fire, the excess air ratio of a gas-fueled internal combustion engine.

2. Discussion of the Related Art

Recent years have seen an increased demand for the use of gaseous fuels as a primary fuel source in compression ignition engines. Gaseous fuels such as propane or natural gas are considered by many to be superior to diesel fuel and the like because gaseous fuels are generally less expensive, provide equal or greater power with equal or better mileage, and produce significantly lower emissions. This last benefit renders gaseous fuels particularly attractive because recently enacted and pending worldwide regulations may tend to prohibit the use of diesel fuel as the primary fuel source in many engines. The attractiveness of gaseous fuels is further enhanced by the fact that existing compression ignition engine designs can be readily adapted to burn these fuels.

One drawback of gaseous fuels is that they have a relatively narrow range of useful excess air ratios or lambdas (defined as the ratio of total air available for combustion to that required to burn all of the fuel). In any fuel, if lambda drops below a minimum threshold, $NO_x$ and other emissions increase to unacceptable levels. On the other hand, if lambda rises above a maximum acceptable threshold, misfiring can occur, resulting in excessive unwanted emissions, and sharply decreased thermal efficiency. It is therefore essential for optimum control of combustion in an internal combustion engine to maintain lambda values within a permissible range, and preferably to cause lambda values to approach optimum levels.

Lambda control is particularly critical in gas fueled engines. Diesel engines have an extremely broad range of useful lambdas, ranging from about 1.3 at full power to about 10 at idle. Lambda control is rarely, if ever, required in such engines. On the other hand, referring to the curves $1_1$, $1_2$, and $1_3$ in FIG. 1 (illustrating lambda values at 1500 RPM, 1800 RPM, and 2100 RPM, respectively), in an engine using a small injection of pilot oil to ignite the pre-mixed air and gas by means of compression ignition of the pilot oil distributed throughout the gas/air mixture, the useful lambda range is much narrower (on the order of 1.2 to 3.0). This range decreases still further for a spark ignition engine—namely: lambda 1.2 to 1.6. The criticality of lambda control in gas engines is amply illustrated in FIG. 2, the curve $2_1$ of which illustrates that Nox emissions, as measured by brake specific NOx (BSNOx), are highest in both spark ignited and compression ignited gas engines at about lambda 1.1 and drop off dramatically at lambdas above about 1.3. Accordingly, the useful minimum lambda value is about 1.2. Thermal efficiency in spark ignited gas engines drops dramatically when lambda is greater than about 1.6 due to misfire (as represented by phantom curve $2_3$), requiring that lambda be maintained in a very narrow range for efficient engine operation. Curve $2_2$ illustrates that reducing lambda to maintain thermal efficiency is less critical for compression ignited gas engines, but is still important to prevent misfire as lambda approaches the maximum value of about 3.0 (not shown in FIG. 2).

Experiments on a Caterpillar 3406B dual fuel gas/diesel engine operated without skip fire showed the detrimental effects of low-load operation. Comparing the curve $4_1$ of FIG. 4 to curve $4_2$, the fuel efficiency of this dual fuel engine decreased by 10% or more at half load and high engine RPM when compared to the same engine operated at full load, while efficiency of a diesel-only engine remained essentially unchanged (see curves $4_3$ and $4_4$). Similarly, at low load, hydrocarbon emissions of a dual fuel engine were grossly unacceptable at 90 g/hp-hr or 5000 BTU/hp-hr (curve $5_1$ and CO emissions were relatively high at about 25 g/hp-hr (curve $5_2$). On the other hand, as illustrated by the curves $5_3$ and $5_4$, the corresponding levels for a diesel-only engine were relatively low.

While at least some of the potential beneficial effects of lambda control were known, an effective mechanism for controlling lambda was not. The air quantity and lambda of gaseous fueled engines utilizing pre-mixed air and gas were usually controlled by a throttle such as in typical gasoline fueled engines. A throttle, by its nature of causing a pressure loss in the intake system, is inefficient and greatly reduces engine thermal efficiency under part load and idle conditions. The idle fuel consumption of a throttled engine is about twice that of an unthrottled engine.

One technique for greatly reducing or eliminating throttle loss in an internal combustion engine is to selectively eliminate firing cycles (sometimes called "skip fire") by eliminating fuel supply and ignition from a selected number of the cylinders of the engine and to add the eliminated fuel to the remaining firing cylinders. This technique has been utilized in the prior art to improve engine performance, and is described extensively in the literature. However, all known prior art skip fire control schemes were configured without regard to lambda control.

For instance, starting as early as the turn of the century, skip fire has been used extensively for optimizing engine performance. In the early 1900's, nearly all stationary single cylinder Otto cycle engines were unthrottled and governed by skip fire. The intake mixture was pre-mixed fuel and air and maintained at an essentially constant lambda and inducted through an intake valve in the form of a spring-loaded check valve opened by the slight vacuum in the cylinder during the intake stroke. The engine power output and speed were controlled by a governor which held the exhaust valve open during overspeed conditions, thereby re-ingesting exhaust gas and consequently preventing the intake valve from opening and causing skip fire. At underspeed conditions, the exhaust valve was permitted to operate normally and caused the engine to inject a full charge of air fuel mixture on each cycle; hence, every firing was at full power and constant lambda until governed speed was again exceeded. It can thus be seen that skip fire control in these early systems was purely mechanical and was performed without regard to lambda for the sole purpose of controlling engine speed and power.

Skip fire is also disclosed in U.S. Pat. No. 2,771,867 to Peras, U.S. Pat. No. 4,504,488 to Förster, and Reissue U.S. Pat. No. 33,270 to Beck et al. While the control schemes of these patents, and particularly the Förster patent, is somewhat complicated, the criterion for the selection of the number of cylinders skipped is determined solely as a function of load, not lambda. Similar control schemes are disclosed in SAE Paper Nos. 930497 and 940548.

As another example, the 8,6,4 skip fire Cadillac engine, manufactured by General Motors in the late 1970s, used electro-mechanical deactivation of intake valves. The deactivation of cylinders in this system was also performed solely on the basis of load and had no effect on lambda. The Detroit Diesel 6V92 dual fuel gas/diesel engine also used skip fire, but the selection of number of cylinders skipped was rather arbitrary and not done as a specific means to optimize lambda. The fuel economy of this system was quite inferior to that of a base diesel engine as shown by a comparison of the curves $3_1$ and $3_2$ in FIG. 3. Power, on the other hand, was relatively unaffected by skip fire (See curve $3_3$).

The inventors of the present invention have also experimented with skip fire in the past, but not for lambda control. In addition to experimenting with the control scheme described in the Beck patent, they investigated the effect of skip fire on idle fuel consumption for a throttled, spark ignited GM 4.3 V-6 turbo lean engine fueled by natural gas. As illustrated by the bar graphs $6_1$ to $6_6$ in FIGS. 6a and 6b, these experiments revealed that, under no load conditions, THC (total hydrocarbon emissions) and fuel economy in a skip fire multipoint injection system improved significantly as compared to both multipoint and singlepoint injection systems without skip fire. Although skip fire was used in this system, the function was to maximize the efficiency by reducing intake manifold vacuum and increasing manifold pressure, not to control lambda per se. The selection of optimum fraction of cylinders firing (OFF) therefore was dependent on load demand. In addition, any lambda variation caused by skip fire in this system, as well as at least most of the remaining systems discussed above, was negligible since lambda was controlled by the throttle and gas fuel rate, not by skip fire.

The preceding discussion reveals that, although the techniques for achieving skip fire are contained in prior art, the strategy for how to select the optimum number of firing cylinders for lambda control is not. The inventors now realize that lambda can be optimized and engine performance improved dramatically by lambda control through skip fire.

OBJECTS AND SUMMARY OF THE INVENTION

It is therefore an object of the invention to provide a method of selecting automatically and continuously the optimum fraction of cylinders firing (OFF) as a function of engine operating parameters to optimize the excess air ratio, lambda.

For practical use, lambda control by "skip fire" requires a means to eliminate the fuel charge from one or more cylinders and to distribute the unused fuel to the remaining firing cylinders, thereby decreasing lambda in the firing cylinders of an unthrottled engine. This object is therefore achieved by ascertaining prevailing engine operating conditions, determining, based upon the prevailing engine operating conditions, an optimum fraction of cylinders (OFF) required to be fired to cause an actual value of lambda, λ, to at least approach an optimum value of λ ($\lambda_{OPT}$), then determining a number (M) of cylinders, the firing of which must be skipped to produce the OFF, M being less than the total number of cylinders, N, and then eliminating a firing and fueling cycle in the M number of cylinders only.

In addition to the effect of fuel demand and air density, other parameters can independently affect combustion and the selection of an optimum value of lambda. Consequently, for more refined and more precise control, some further adjustment in optimum lambda and OFF is warranted as a function of: MAP, EGAP, ACT, EGR, and RPM. To simplify the adaptation to electronic controls, simple ratios and multiplying exponents are used.

If the engine operates without exhaust gas recirculation (egr), a preferred method includes first ascertaining (a) a prevailing indicated mean effective pressure (IMEP), (b) a maximum indicated mean effective pressure ($IMEP_{MAX}$), (c) an air charge temperature (ACT) of an ambient air charge admitted to the intake manifold, (d) a prevailing intake manifold absolute pressure (MAP), (e) a maximum intake manifold absolute pressure ($MAP_{MAX}$), and (f) an empirically derived exponent (a) weighing the effects of changes in the MAP on the performance of the engine. OFF is then calculated according to the equation:

$$OFF = \left(\frac{IMEP}{IMEP_{MAX}}\right)\left(\frac{ACT}{300}\right)\left(\frac{MAP}{3}\right)^a \div \left(\frac{MAP}{MAP_{MAX}}\right)$$

Another object of the invention is to provide a method having the characteristics described above and tailored for use with an engine with exhaust gas recirculation (egr) in which recirculated exhaust gases (EGR) flow from the exhaust manifold to the intake manifold.

In the case in which egr is performed with the use of an adjustable flow-restricting metering orifice, a preferred method includes first ascertaining (a) a prevailing indicated mean effective pressure (IMEP), (b) a maximum indicated mean effective pressure ($IMEP_{MAX}$), (c) an air charge temperature (ACT) of an ambient air charge admitted to the intake manifold, (d) a prevailing intake manifold absolute pressure (MAP), (e) a maximum intake manifold absolute pressure ($MAP_{MAX}$), (f) a first empirically derived exponent "a" weighing the effects of changes in the MAP on the performance of the engine, (g) a second empirically derived exponent "b" relating to a flow coefficient of the metering orifice, and (h) a prevailing exhaust gas absolute pressure EGAP. EGAP may be sensed directly using an EGAP sensor or determined according to the equation: EGAP=MAP+EBP+φ, where EBP is an ascertained pressure drop across the metering orifice and φ is an empirical factor dependent upon the construction of the turbocharger and having a value of between −0.5 bar and 0.5 bar. OFF can then be calculated according to the equation:

$$OFF = \left(\frac{IMEP}{IMEP_{MAX}}\right)\left(\frac{ACT}{300}\right)\left(\frac{MAP}{3}\right)^a \div \left(\frac{MAP}{MAP_{MAX}}\right)\left(\frac{MAP}{EGAP}\right)^b$$

In the case in which egr is performed in the absence an adjustable flow-restricting metering orifice, a preferred method includes first ascertaining (a) a prevailing indicated mean effective pressure (IMEP), (b) a maximum indicated mean effective pressure ($IMEP_{MAX}$), (c) an air charge temperature (ACT) of an ambient air charge admitted to the intake manifold, (d) a prevailing intake manifold absolute pressure (MAP), (e) a maximum intake manifold absolute pressure ($MAP_{MAX}$), (f) an exhaust gas absolute pressure (EGAP), (g) a first empirically derived exponent "a" weighing the effects of changes in the MAP on the performance of the engine, (h) a mass of total mixture ($M_{TOT}$) admitted to the intake manifold, (i) a value equal to a fraction by mass of the EGR to the total mixture ($M_{TOT}$); and (j) a second empirically derived exponent "c" weighing the effects of changes in the EGR on the performance of the engine. OFF can then be calculated according to the equation:

$$\text{OFF} = \left(\frac{IMEP}{IMEP_{MAX}}\right)\left(\frac{ACT}{300}\right)\left(\frac{MAP}{3}\right)^a \left(1+\frac{EGR}{M_{TOT}}\right)^c \div \left(\frac{MAP}{MAP_{MAX}}\right)$$

Still another object of the invention is to provide a method which has one or more of the characteristics described above and which makes adjustments for one or more of ignition timing, engine speed, and egr.

Still another object of the invention is to provide a method of optimizing lambda while reducing the effective compression ratio to control combustion and detonation.

In accordance with still another aspect of the invention, this object is achieved by retarding ignition timing to beyond top dead center (TDC).

Yet another object of the invention is to provide an internal combustion engine in which provisions are made for selecting, automatically and continuously, the optimum fraction of cylinders firing (OFF) as a function of engine operating parameters to optimize excess air ratio, lambda.

In accordance with yet another aspect of the invention, this object is achieved by providing an internal combustion engine comprising a number N of cylinders, a gaseous fuel injection system associated with the N cylinders, an intake manifold cooperating with each of the cylinders, and a control system which controls the operation of the engine. The control system includes (a) a plurality of sensors, each of which monitors an engine operating condition, (b) means, responsive to the sensors, for determining an optimum fraction of cylinders (OFF) required to be fired to cause an actual value of $\lambda$ to at least approach an optimum value of $\lambda$ ($\lambda_{OPT}$), (c) means for determining a number (M) of cylinders the firing of which must be skipped to produce the OFF, M being less than N, and (d) means for controlling the engine to eliminate a firing and fueling cycle in the M number of cylinders only.

Preferably, the sensors monitor a prevailing indicated mean effective pressure (IMEP), an air charge temperature (ACT) of an ambient air charge admitted to the intake manifold, and a prevailing intake manifold absolute pressure (MAP). The means for determining calculates the OFF according to the equation:

$$\text{OFF} = \left(\frac{IMEP}{IMEP_{MAX}}\right)\left(\frac{ACT}{300}\right)\left(\frac{MAP}{3}\right)^a \div \left(\frac{MAP}{MAP_{MAX}}\right),$$

where:
$IMEP_{MAX}$=a maximum indicated mean effective pressure,
$MAP_{MAX}$=a maximum intake manifold absolute pressure, and
"a" is an empirically derived exponent weighing effects of changes in the MAP on the performance of the engine.

The above equation can, if necessary, be modified to take into account the effects of exhaust gas recirculation (egr).

Other objects, features and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 7b schematically illustrates the combustion airflow control systems of the engine of FIG. 7b;

DETAILED DESCRIPTION OF THE PREFERRED EMBODIMENTS

1. Résumé

Pursuant to the invention, the performance of a gas-fueled unthrottled internal combustion engine is improved by optimizing excess air ratio (lambda) in the engine. Lambda is optimized by selecting automatically and continuously the optimum fraction of cylinders firing (OFF) as a function of engine operating parameters, eliminating the fuel charge from one or more cylinders to obtain firing in the OFF, and distributing the unused fuel to the OFF, thereby decreasing lambda in the firing cylinders to an optimum level. OFF may be calculated according to mathematically derived and empirically weighted equations, or obtained with reference to suitable look-up tables. In addition, optimum lambda and OFF may be adjusted to take into account the effects of exhaust gas recirculation (egr), engine speed, and/or ignition timing. Changing ignition timing beyond TDC can also be used to reduce the effective pressure ratio and improve combustion and detonation. Manifold absolute pressure, egr, and ignition timing can also be adjusted to "fine tune" the effects of skip fire.

2. System Overview

Figure 10:
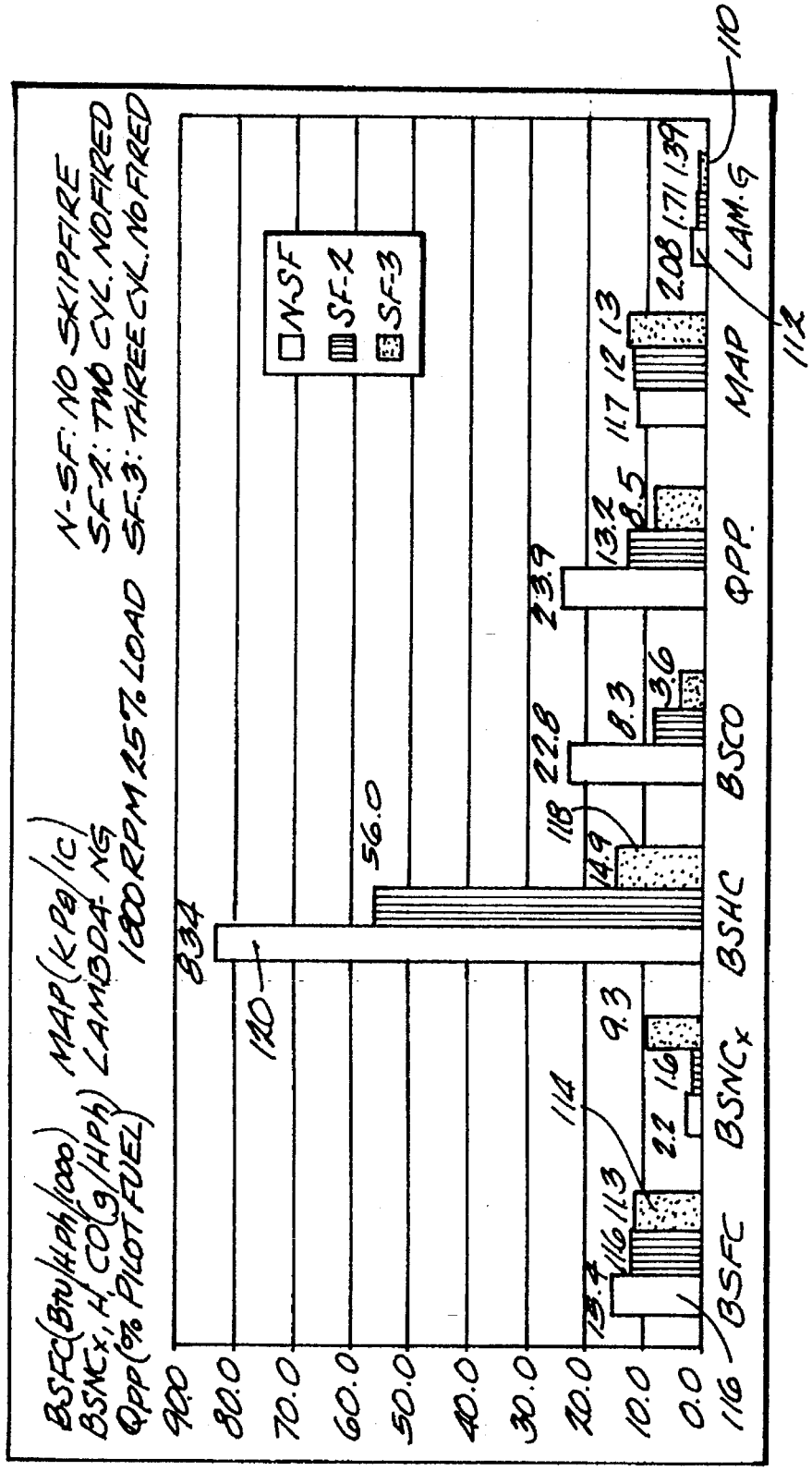
FIG. 10 is a graph illustrating the effects on a gas fueled engine of lambda control by skip fire.

The application of lambda control by skip fire has been reduced to practice by the inventors on a 7.6 liter gas/diesel engine. As illustrated in FIG. 10, tests have shown that firing on half of the cylinders (OFF=0.5) at 25% load reduced lambda from 2.08 to 1.39 (compare curves 110 and 112). Fuel consumption decreased by 27% and hydrocarbon emissions decreased from 83 to 15 g/hp-hr, or 82% when compared to operation of the same engine without skip fire (compare curves 114 with 116 and 118 with 120). FIG. 10 further illustrates that other engine performance characteristics also improved dramatically when lambda was optimized by skip fire. An engine 10 on which lambda optimization by skip fire can be performed and a method and electronic system for such optimization will now be described.

Figure 7A:
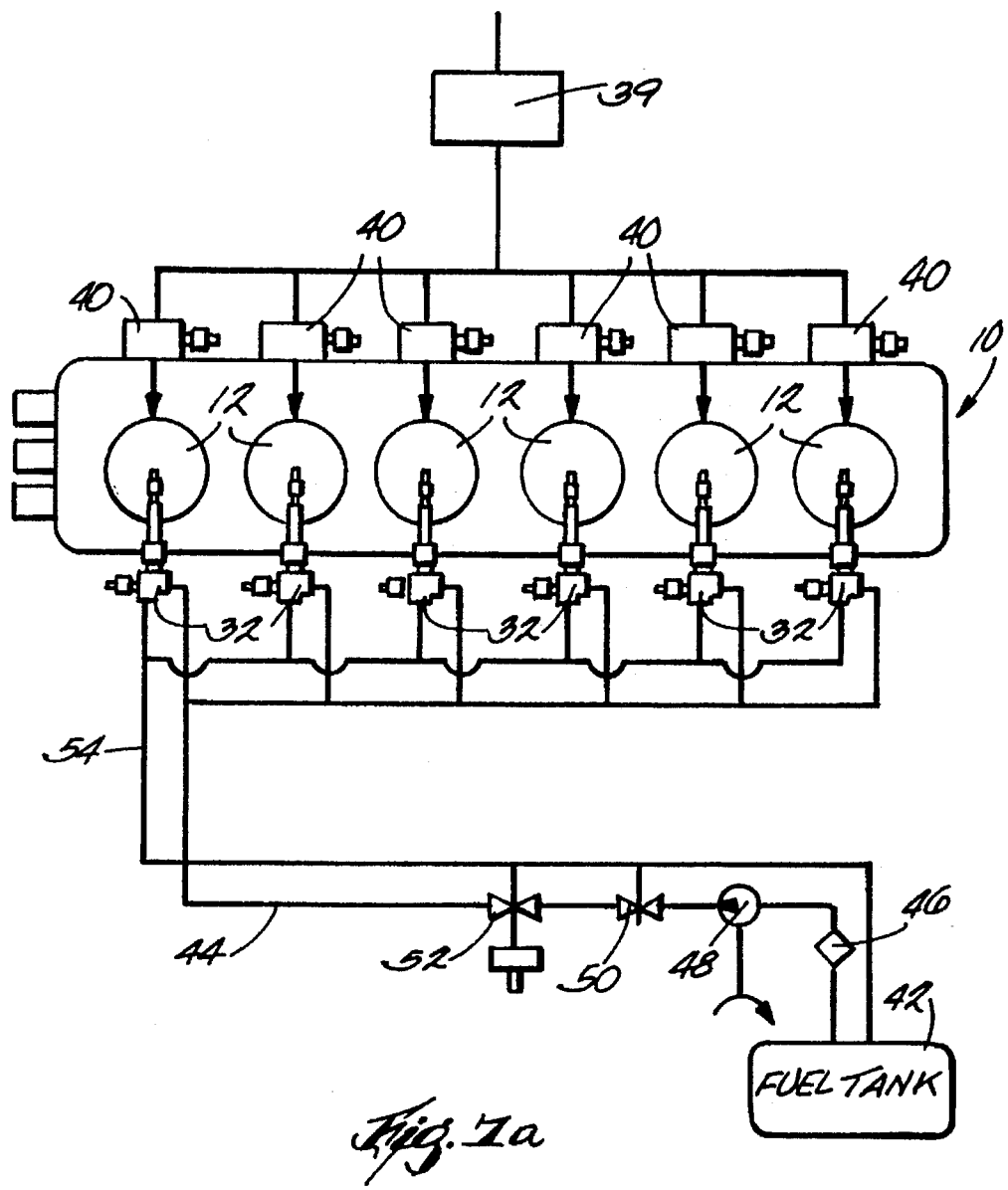
FIG. 7a schematically illustrates the fuel supply systems of an internal combustion engine on which the inventive skip fire scheme can be implemented.
Figure 1B:
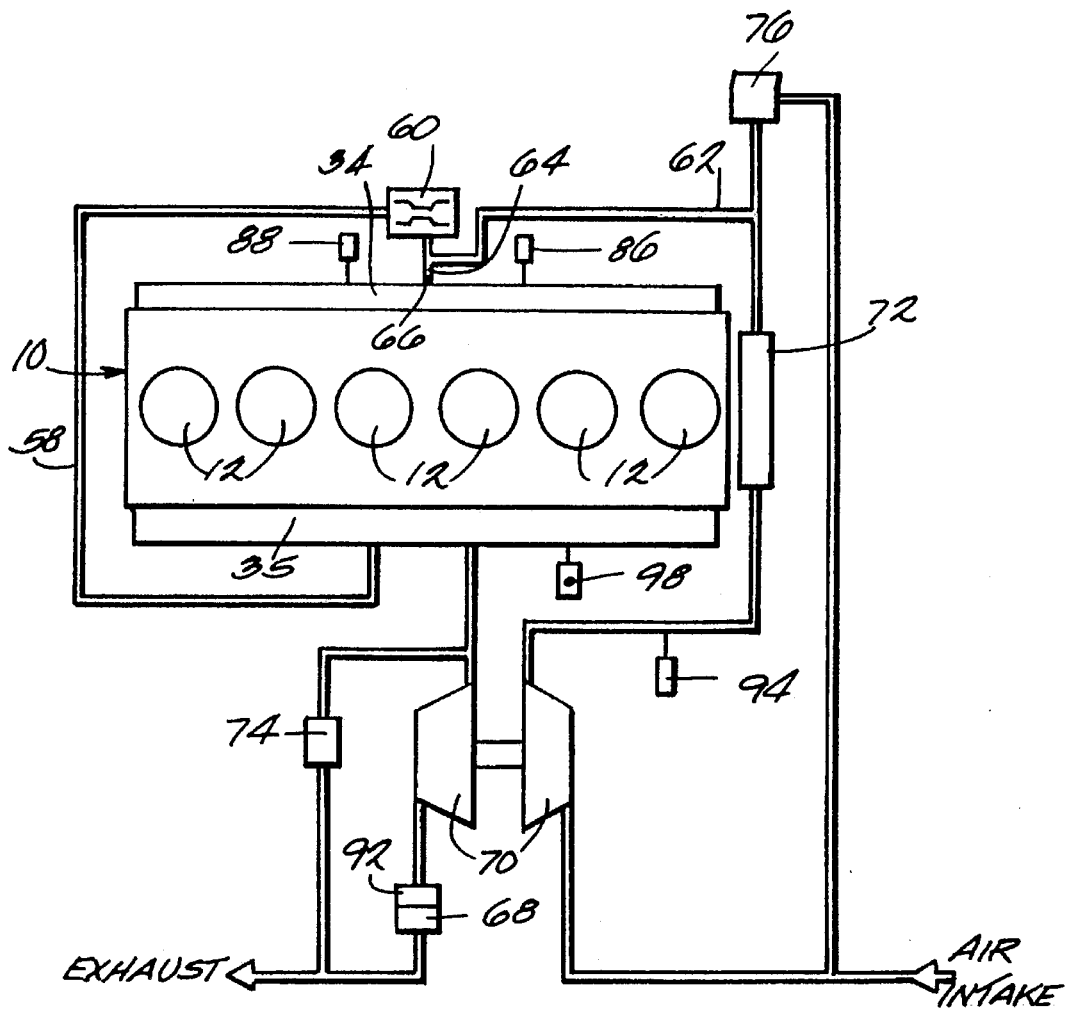
Figure 8:
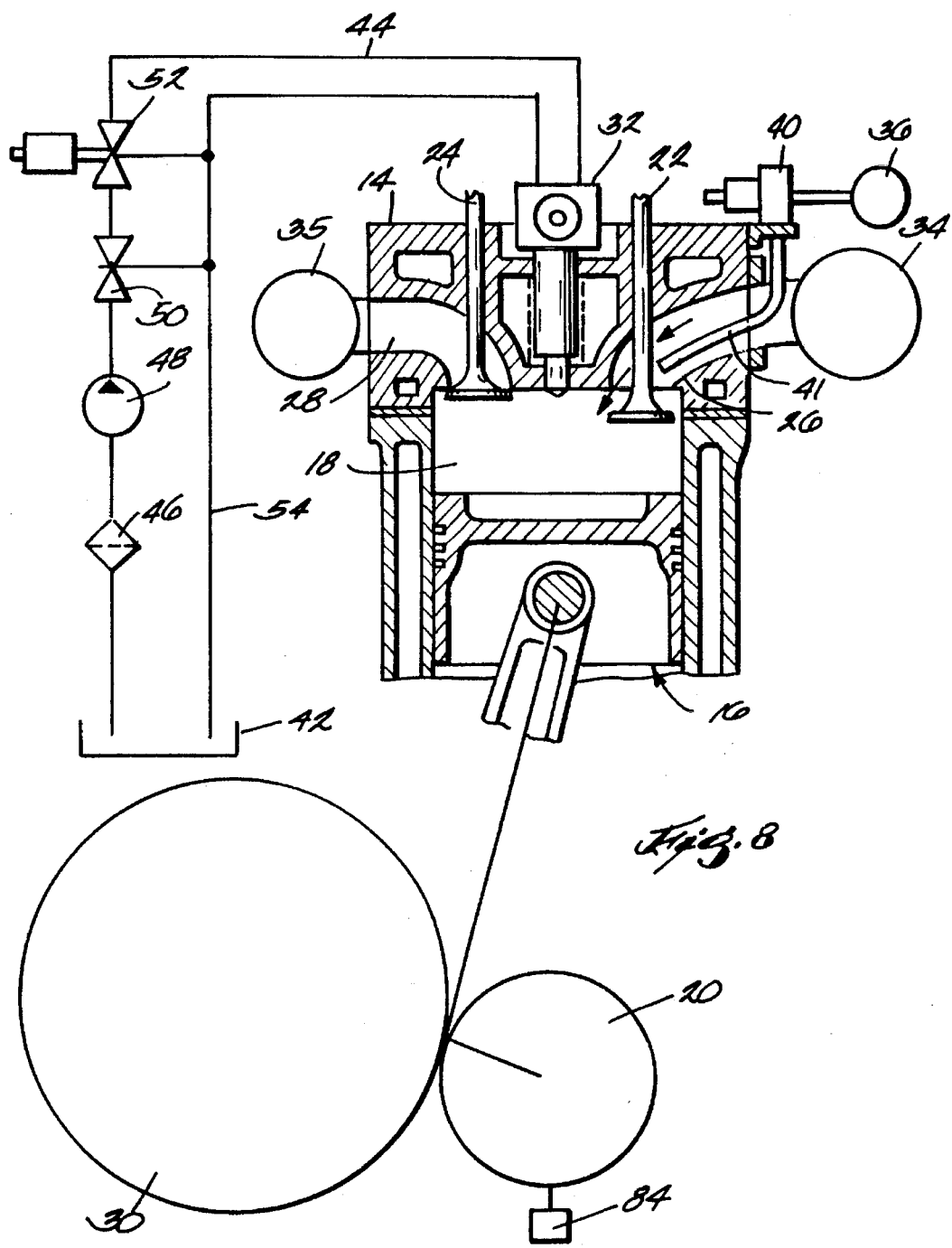
FIG. 8 is a partially schematic sectional side elevation view of a portion of the engine of FIGS. 7a and 7b.
Figure 9:
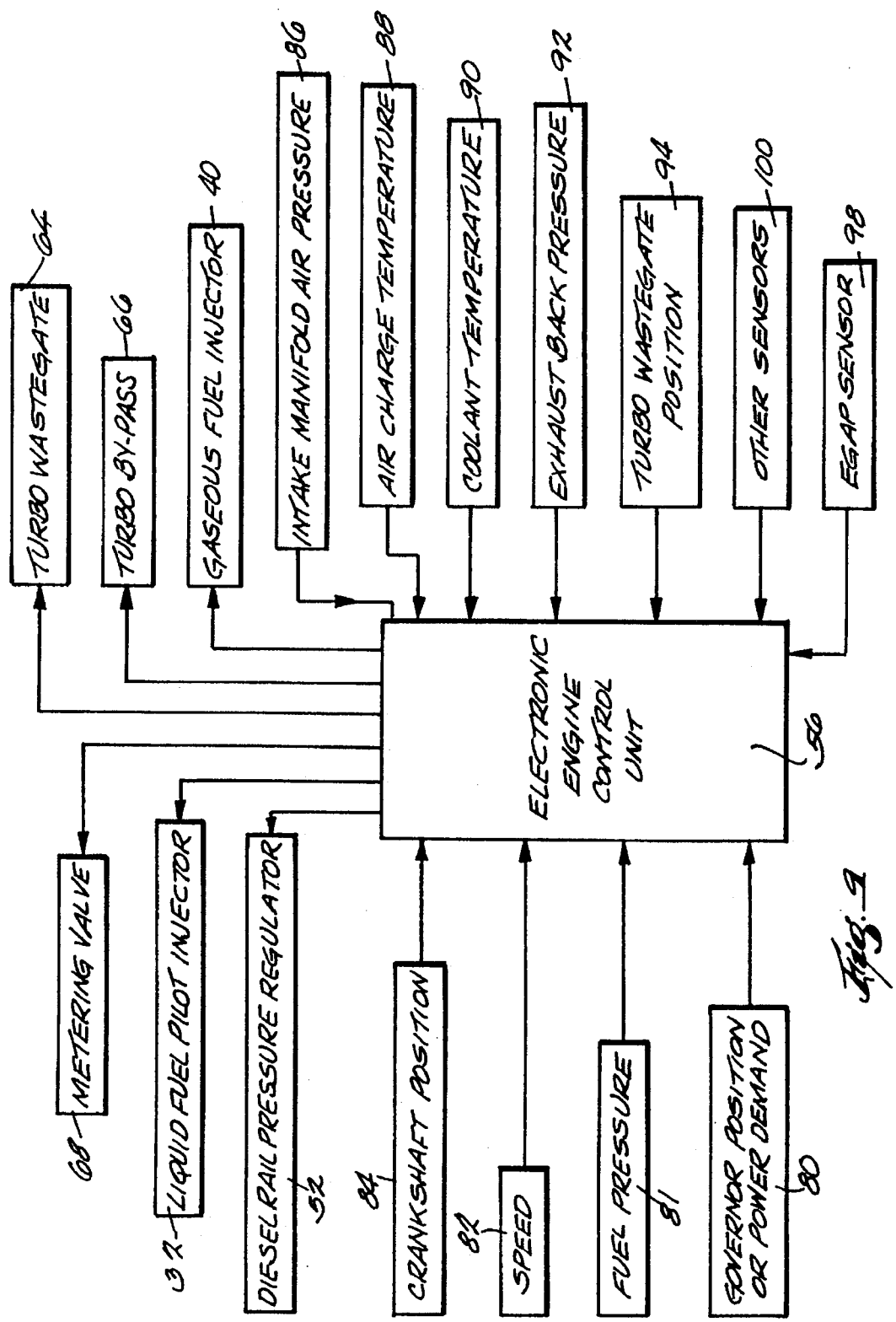
FIG. 9 schematically represents an electronic controller for the engine of FIGS. and 8.

Referring now to FIGS. 7a–9, engine 10 is a compression ignition-type internal combustion engine having a plurality of cylinders 12 each capped with a cylinder head 14 (FIG. 8). As is also shown in FIG. 8, a piston 16 is slidably disposed in the bore of each cylinder 12 to define a combustion chamber 18 between the cylinder head 14 and the piston 16. Piston 16 is also connected to a crankshaft 20 in a conventional manner. Conventional inlet and exhaust valves 22 and 24 are provided at the end of respective passages 26 and 28 in the cylinder head 14 and are actuated by a standard cam shaft 30 so as to control the supply of an air/fuel mixture to and the exhaust of combustion products from the combustion chamber 18. Gases are supplied to and exhausted from engine 10 via an intake air manifold 34 and an exhaust manifold 35, respectively. However, unlike in conventional engines, a throttle valve which would normally be present in the intake manifold 34 is absent or at least disabled, thereby producing an "unthrottled" engine. An intake air control system may also be provided for reasons detailed below.

Gaseous fuel could be supplied via a single metering valve discharging into a single throttle body at the entrance of the manifold 34, or via a similarly-situated mechanically controlled valve. In the illustrated embodiment, however, a separate injector 40 is provided for each cylinder 12. Each injector 40 receives natural gas, propane, or another gaseous fuel from a common tank 39 and a manifold 36 and injects fuel directly into the inlet port 26 of the associated cylinder 12 via a line 41.

The engine 10 could be either spark ignited or compression ignited. The illustrated engine 10 is compression ignited and accordingly employs multiple electronically controlled liquid fuel injectors 32 as pilot fuel injectors. Each pilot fuel injector 32 could comprise any electronically controlled injector and preferably takes the form of an electro-hydraulic fuel injector, more preferably a pressure-intensified accumulator-type injector of the type disclosed in Reissue U.S. Pat. No. 33,270. Referring to FIGS. 7a and 8, injector 32 is fed with diesel fuel or the like from a conventional tank 42 via a supply line or common rail 44. Disposed in line 44 are a filter 46, a pump 48, a high pressure relief valve 50, and a pressure regulator 52. A return line 54 also leads from the injector 32 to the tank 42.

Referring to FIG. 7b, the air intake control system may include (1) an exhaust gas recirculation (egr) subsystem permitting recirculated exhaust gases (EGR) to flow from an exhaust manifold 35 to the intake manifold 34 and/or (2) a turbocharging subsystem which charges non-EGR air admitted to the intake manifold 34. The egr subsystem, which is useful for increasing combustion reactivity and extending the upper limit for optimum lambda, includes (1) a return line 58 leading from the exhaust manifold 35 to the intake manifold 34 and (2) an EGR metering valve 60. Valve 60 also has an outlet connected to an intake line 64 leading to an intake port 66 of the intake manifold 34. A second line 62 leads from a turbo bypass valve 76 to the line 64 downstream from valve 60. In addition, an exhaust back pressure (ebp) valve 68 having an adjustable flow-restricting metering orifice may be provided in the exhaust gas stream to control the exhaust gas absolute pressure (EGAP). Valve 68, if present, can be actuated by a controller 56 (FIG. 9) to adjust the percentage of EGR in the total charge admitted to intake port 66 without controlling valve 60.

As is further shown in FIG. 7b, the turbocharging subsystem of the intake air control system includes a turbocharger 70 and an aftercooler 72 provided in line 62 upstream of the valve 60 and intake port 66. Operation of the turbocharger 70 is controlled in a conventional manner by a wastegate 74 and a turbo bypass 76, both of which are electronically coupled to the controller 56.

The controller or electronic control unit (ECU) 56 may comprise any electronic device capable of monitoring engine operation and of controlling the supply of fuel and air to the engine 10. In the illustrated embodiment shown in FIG. 9, this ECU 56 comprises a programmable digital microprocessor. Controller or ECU 56 receives signals from various sensors including a governor position or other power demand sensor 80, a fuel pressure sensor 81, an engine speed (RPM) sensor 82, a crank shaft angle sensor 84, an intake manifold absolute pressure (MAP) sensor 86, an intake manifold air charge temperature (ACT) sensor 88, an engine coolant temperature sensor 90, a sensor 92 measuring exhaust back pressure (EBP), and a sensor 94 monitoring the operation of the wastegate 74, respectively. The controller 56 also ascertains EGAP either directly from an EGAP sensor 98, indirectly from the EBP sensor 92 (if ebp valve 68 is used). Other sensors required to optimize lambda and otherwise control fuel injection are illustrated at 100 in FIG. 9. Other values, such as indicated mean effective pressure (IMEP) and the volume and quantity of gas ($Q_{gas}$ and $V_{gas}$, respectively) injected are calculated by the controller 56 using data from one or more of the sensors 80–100 and known mathematical relationships. Still other values, such as maximum intake manifold absolute pressure ($MAP_{MAX}$), maximum indicated mean effective pressure ($IMEP_{MAX}$), maximum engine speed ($RPM_{MAX}$), volumetric efficiency ($\eta_{vol}$), and various system constants are preferably stored in a ROM or other storage device of controller 56. Controller 56 manipulates these signals and transmits output signals for controlling the diesel rail pressure regulator 52, the pilot fuel injector 32, and the gas injector 40, respectively. Similar signals are used to control the turbo wastegate 74, the turbo bypass 76, and the metering orifice or EBP valve 68, respectively.

Pursuant to the invention, the controller 56 (1) receives the signals from the various sensors, (2) performs calculations based upon these signals to determine an optimum fraction of cylinders (OFF) required to be fired to optimize lambda, and (3) controls the injectors 32 and 40 to eliminate fueling and firing cycles in selected cylinders to provide OFF. One possible control scheme will now be described.

3. Calculation of OFF

The inventors have discovered that optimum lambda for gaseous fuel is affected largely by the following parameters:

Indicated mean effective pressure, (IMEP) indicated power level, bar;

Air charge temperature, (ACT), deg K, prior to addition of EGR;

Intake manifold absolute pressure, (MAP), bar;

Cylinder displacement, cyl disp, cm$_3$;

Volumetric efficiency, ($\eta_{vol}$);

Gas fuel charge, $Q_{gas}$, mg/cycle/cyl;

Gas fuel volume, vol gas, cm$^3$/cyl;

Ignition timing, degrees before top dead center (BTDC);

Exhaust gas recirculation, (EGR), mass of recirculated exhaust gases;

Exhaust back pressure, (EBP) pressure drop caused by ebp valve, bar;

Exhaust gas absolute pressure, (EGAP), bar;

Engine speed, (RPM);

Engine coolant temperature, (ECT), deg K;

Turbo wastegate position, (TGP);

Turbo air bypass, (TAB);

Air and gas density 1.1 and 0.607 mg/cm$^3$ @MAP=1 bar and ACT=300° K

These various parameters can be grouped according to their effects on lambda as follows:

a. Effects of fuel demand and air density as a function of IMEP, ACT, MAP and volumetric efficiency.

Excess air ratio, lambda ($\lambda$) is determined by the ratio of air charge to fuel charge and can be readily calculated from the typical parameters as follows:

$$\lambda_{gas} = \rho_{air} \left( \frac{300}{ACT} \right) (MAP)(cyl\, disp) \left( \eta_{vol} - \frac{vol\, gas}{cyl\, disp} \right) \div (Q_{gas}) \left( \frac{A}{F} \right) stoich$$

Figure 4:
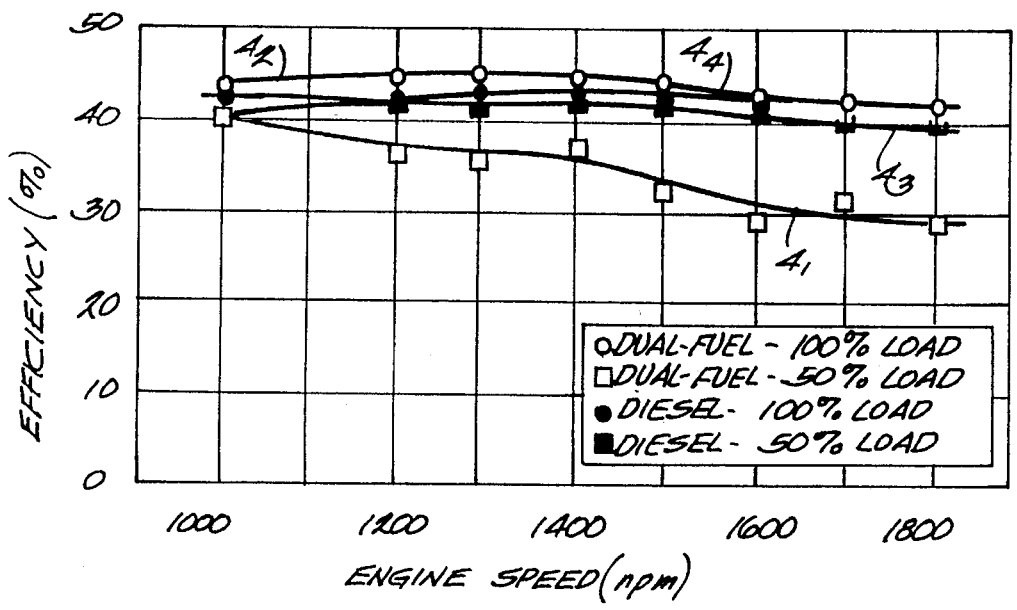
FIGS. 4 and 5 are graphs illustrating the performance of another prior art engine operated without skip fire, appropriately labeled "PRIOR ART"
Figure 5:
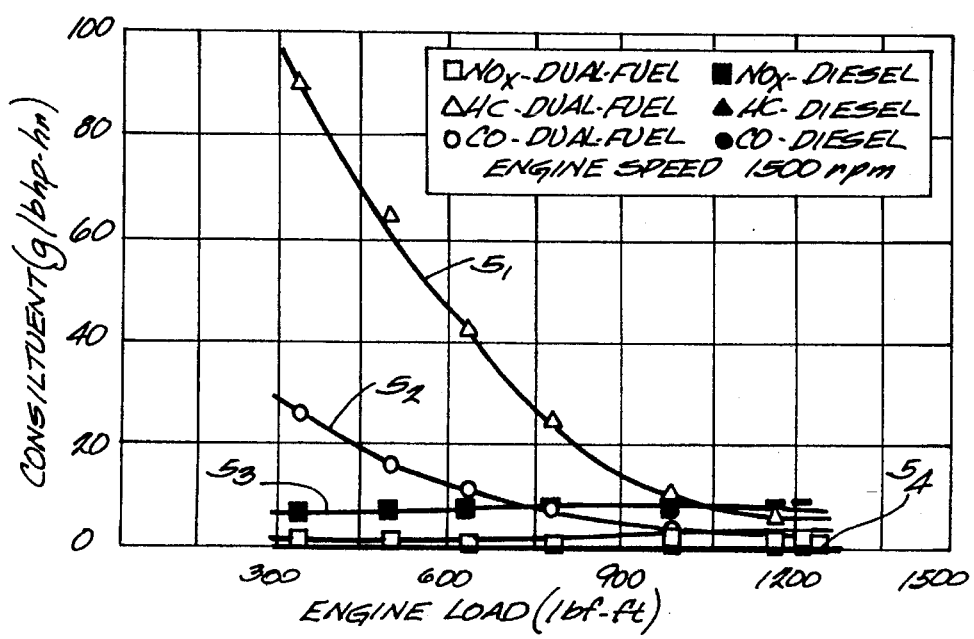
Figure 6B:
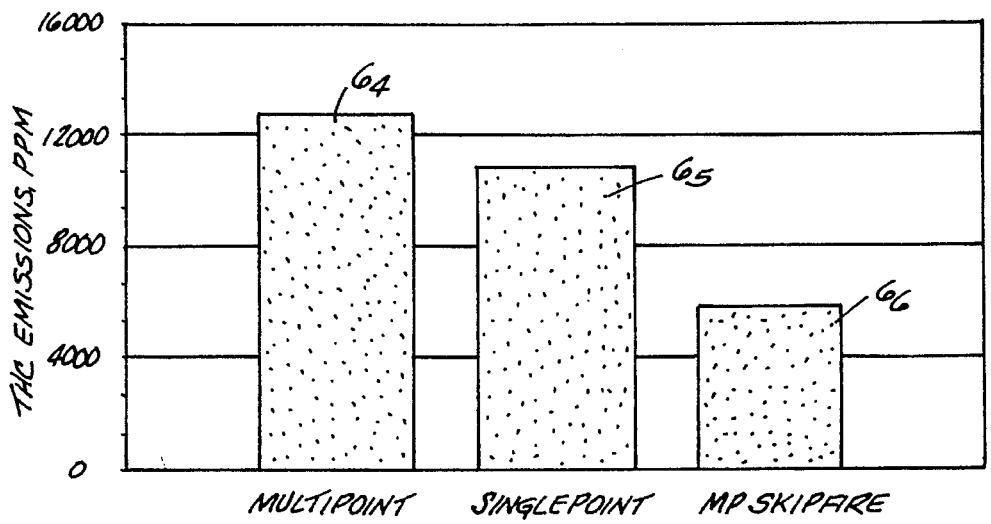
FIGS. 6a and 6b are graphs illustrating the effects of a skip fire control scheme performed, without regard to lambda, on a throttled, spark ignited engine fueled by natural gas.
Figure 6A:
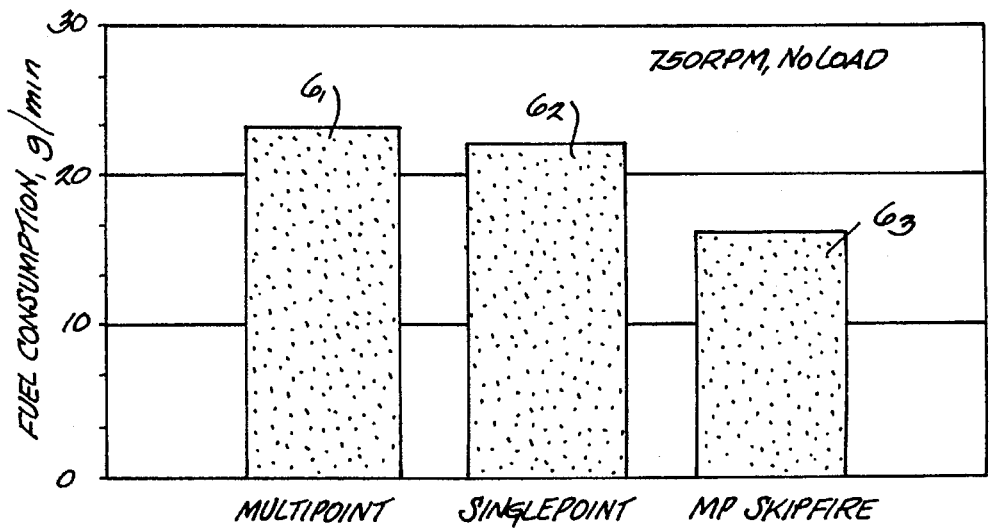

A gas fueled engine using a compression ignition pilot has no lean ignition limit. Consequently, at high loads, normal engine operation can be obtained with no control of lambda. This is particularly true for an otherwise unmodified unthrottled turbocharged diesel engine which operates with excess air at all times. The power can be controlled quite adequately with fixed pilot and variable gas fuel supply without any consideration of control of lambda. However, at light load, lambda increases greatly, resulting in very high exhaust emissions and excessive fuel consumption as shown by the curves $4_1$, $5_1$, and $5_2$ in FIGS. 4 and 5. Selection and control of lambda by optimizing the number of cylinders firing can greatly reduce or eliminate these deficiencies. As a minimum, such control will require at least the following:

(A) Cylinder-by-cylinder and cycle-by-cycle control of gas injection quantity and timing;

(B) Cylinder-by-cylinder and cycle-by-cycle control of pilot oil injection quantity and timing; and (C) Skip fire control for optimum lambda.

Controlling (A) is well known, and controlling (B) is discussed in detail in commonly assigned patent application Ser. No. 08/237,445 (the '445 application) and entitled Electronically Controlled Pilot Fuel Injection of Compression Ignition Engines, now U.S. Pat. No. 5,450,829. The subject matter of this earlier patent is hereby incorporated by reference in its entirety. Controlling (C) is the subject of the present application and is detailed below.

b. Combustion Effects

In addition to the effect of fuel demand and air density, other parameters can independently affect combustion and the selection of an optimum value of lambda. Consequently, for more refined and more precise control, some further adjustment in optimum lambda and OFF is warranted as a function of: MAP, EGAP, ACT, EGR, and RPM. To simplify the adaptation to electronic controls, simple ratios and multiplying exponents are used.

Figure 11:
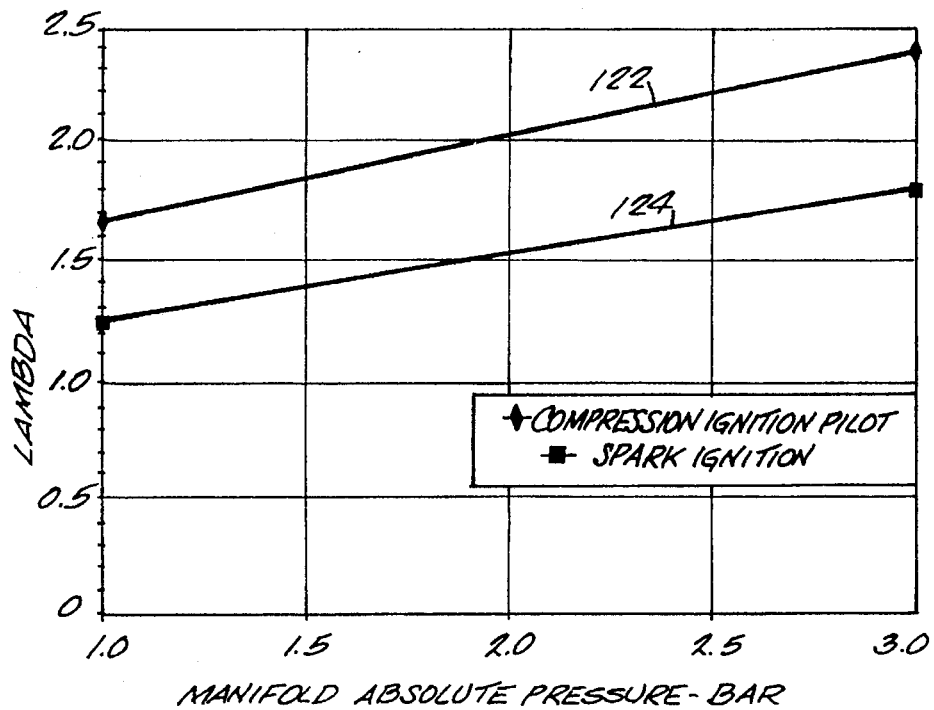
FIG. 11 is a graph illustrating variations in optimum lambda with changes in manifold absolute pressure (MAP)

For instance, lambda tends to increase with MAP as illustrated by the curves 122 and 124 in FIG. 11. MAP adjustment is included in the calculation of optimum lambda ($\lambda_{OPT}$) by incorporating the factor of (MAP)$^a$. $\lambda_{OPT}$ varies approximately as the one-third power of MAP or a value of a=0.33. This exponent can be adjusted for individual engines as shown in Table 1 below.

EGR affects engine operation in several ways: EBP; MAP; parasitic power; fuel flow at no load, residual exhaust gas; and effective in-cylinder temperature. In general, both EGAP and EGR tend to increase optimum lambda and OFF. These effects can be incorporated into the optimum lambda calculation as follows:

$$\left( \frac{MAP}{EGAP} \right)^b,$$

where "b" depends on the characteristics of a particular engine and typically has a value of 0 to 2.0, $$\left( 1 + \frac{EGR}{M_{TOT}} \right)^c,$$

where "c" depends on the characteristics of a particular engine and typically has a value of 0 to 1.0.

c. Speed Effect

Optimum lambda and OFF can also be adjusted as a function of engine speed (RPM) according to the empirically-derived equation:

$$\left( 1 + \frac{RPM}{RPM_{MAX}} \right)^d,$$

where "d" depends on the characteristics of a particular engine and typically has a value of 0 to 0.3.

d. Ignition Timing Effect

Ignition timing also has an independent effect on optimum lambda and OFF. This effect is not readily defined as a simple ratio, but the selection of optimum lambda as a function of ignition timing can be made as a compromise between fuel consumption and exhaust emissions and contained in a conventional look-up table. The generalized effect of ignition timing is shown by the curves 126–134 in FIG. 12., in which the curve 130 plots the effects at top dead center (TDC) ignition, curves 126 and 128 plot the effects of ignition after TDC, and curves 132 and 134 plot the effects of ignition before TDC. These curves demonstrate that BSNOx increases at a designated lambda value with advances in ignition timing. Accordingly, the adverse effects on NOx arising through skip fire (if present) control can be offset by retarding ignition timing.

e. ACT Effect

Increased ACT usually results in an increase in optimum lambda. This effect can be included in OFF calculations by adding an additional exponent to the air density correction of (ACT/300) or (ACT/300)$^{1+e}$, where "e" depends on characteristics of the specific engine.

Analysis of the effect of these various parameters and their effect on engine performance, combustion and exhaust emissions has led to the following mathematical relationships for the optimum fraction of cylinders firing, OFF:

$$\text{OFF} = \left(\frac{IMEP}{IMEP_{MAX}}\right)\left(\frac{ACT}{300}\right)\left(\frac{MAP}{2}\right)^{a} \div \left(\frac{MAP}{MAP_{MAX}}\right) \quad \text{(Eq. 1)}$$

For the case in which egr is used and the EGR is fed through a metering orifice 60 from the exhaust manifold 35 to the intake port 66 downstream of the aftercooler 72, the OFF is further adjusted as follows:

$$\text{OFF} = \left(\frac{IMEP}{IMEP_{MAX}}\right)\left(\frac{ACT}{300}\right)\left(\frac{MAP}{3}\right)^{a} \div \left(\frac{MAP}{MAP_{MAX}}\right)\left(\frac{MAP}{EGAP}\right)^{b} \quad \text{(Eq. 2)}$$

where:
b=coefficient>0.0 depending on the EGR metering orifice flow coefficient; and
EGAP may be sensed directly by sensor 98 or determined from the following relationship: EGAP=MAP+EBP+ϕ; where so is an empirical factor determined from the turbocharger map. Typical values for ϕ will be in the range of ±0.5 bar.

If EGAP is not used to control EGR, then an adjustment can be made based on EGR flow as ascertained as a fraction of total flow as follows:

$$\text{OFF} = \left(\frac{IMEP}{IMEP_{MAX}}\right)\left(\frac{ACT}{300}\right)\left(\frac{MAP}{3}\right)^{a}\left(1+\frac{EGR}{M_{TOT}}\right)^{c} \div \left(\frac{MAP}{MAP_{MAX}}\right) \quad \text{(Eq. 3)}$$

As discussed above, the use of EGR can cause an increase in combustion reactivity and extend the upper limit for optimum lambda. An adjustment in optimum lambda and OFF based upon EGR can be made by establishing an empirical relationship between EGR and optimum lambda. The OFF multiplier of $(1+EGR/M_{TOT})^c$ can be used to approximate the effect. The value of exponent "c" is considered to be engine specific.

The effect of air charge temperature adds the term (ACT/300)$^{e}$.

The effect of engine speed adds the term $(1+RPM/RPM_{max})^{d}$.

The combined effects of all factors of the above is:

$$\text{OFF} = \frac{IMEP}{IMEP_{MAX}} \left(\frac{ACT}{300}\right)^{1+e} \left(\frac{MAP}{3}\right)^{a} \left(1+\frac{EGR}{M_{TOT}}\right)^{c} \left(1+\frac{RPM}{RPM_{MAX}}\right)^{d} \div \frac{MAP}{MAP_{MAX}} \left(\frac{MAP}{EGAP}\right)^{b} \quad \text{(Eq. 4)}$$

To control detonation limits, a further adjustment on maximum gas injected (minimum lambda) may be controlled by a software strategy generally implemented as follows:

$$Q_{gas_{max}} = \left(\frac{344}{ACT}\right)^{2}\left(\frac{152}{Q_{com}}\right)^{0.5}\left[1+\left(\frac{700}{RPM}\right)^{2}\right] \quad \text{(Eq. 5)}$$

The above equations are derived for a 6 cylinder, 10 liter engine. $Q_{gas}$ is on a per cylinder basis and is dependent on a selected minimum lambda. Minor adjustments may be required for different engine sizes and number of cylinders, but the basic relationships defined by the equations will prevail.

Figure 1:
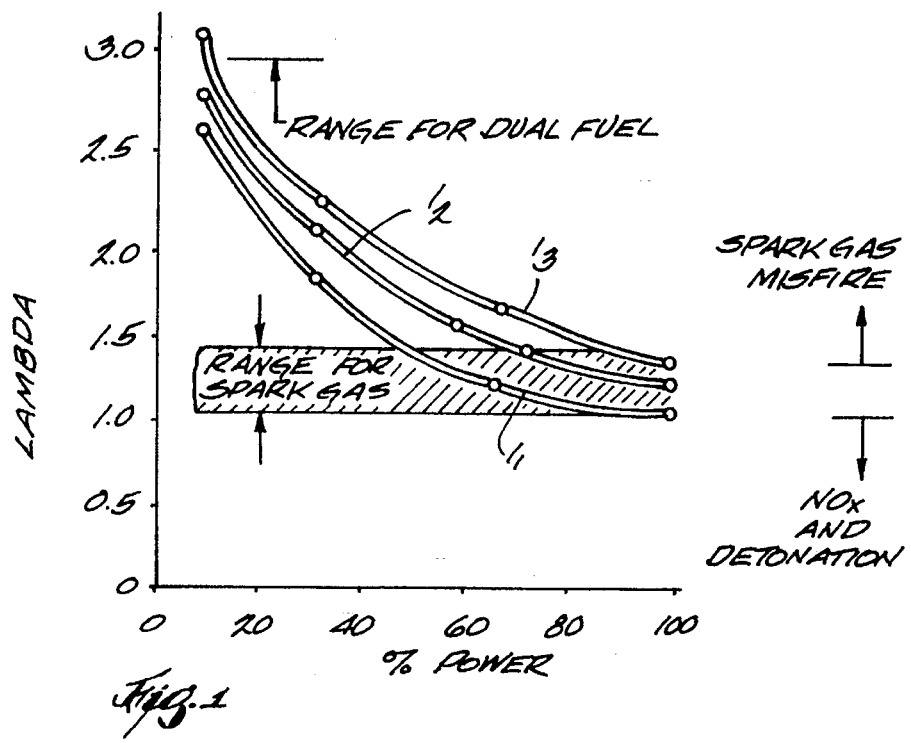
FIG. 1 is a graph of acceptable lambda ranges for compression ignition gas fueled and spark ignition gas fueled engines.
Figure 2:
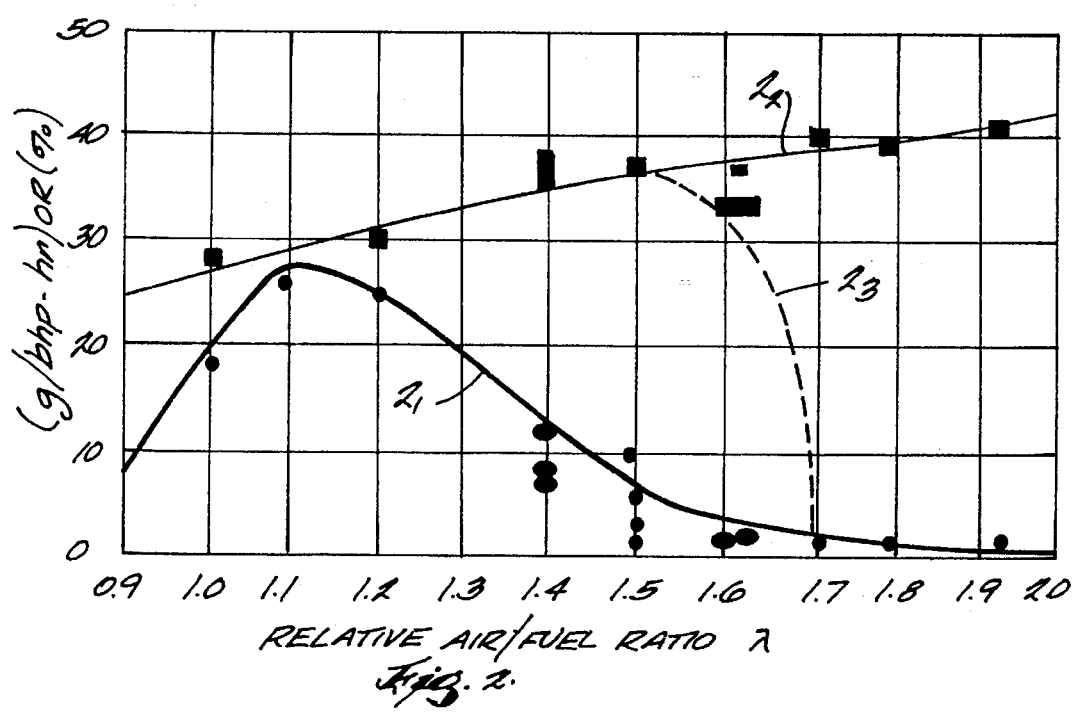
FIG. 2 is a graph illustrating the effects of lambda variation on engine performance.
Figure 3:
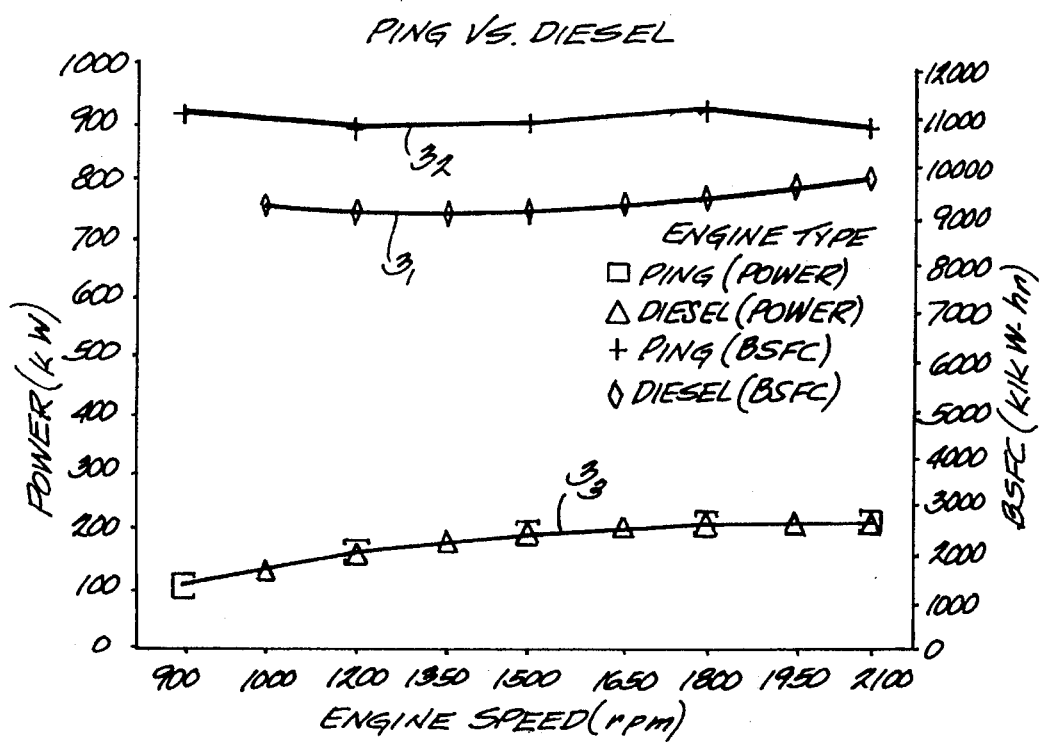
FIG. 3 is a graph of power and fuel economy vs. engine speed for a prior art engine fueled alternately by diesel fuel and natural gas supplied without regard to lambda, and is appropriately labeled "PRIOR ART"

The typical range for optimum lambda is shown in FIG. 1. The upper limit is determined by the detonation limit for compression ignition engines and the lower limit by lean misfire limit for spark ignition engines. For initial calibration or other cases in which empirical exponents or coefficients are unavailable or unknown, a basic calibration "default" table has been prepared as shown in Table 1.

TABLE 1

Typical Range of Empirical Exponents or Coefficients and Default Values

| Parameter | Empirical Number | Range | Default Value |
|---|---|---|---|
| (MAP/3)$^a$ | a | 0.2–0.5 | 0.33 |
| (MAP/EGAP)$^b$ | b | 0–2 | 1.0 |
| (1 + EGR/M$_{TOT}$)$^c$ | c | 0–2 | 1.0 |
| (1 + RPM/RPM$_{MAX}$)$^d$ | d | 0–0.4 | 0.2 |
| (ACT/300)$^{1+e}$ | e | 0–0.5 | 0 |
| MAP + EBP + ϕ | ϕ | −0.5–+0.5 | 0 |

4. Operation of Lambda Control System

Figure 13:
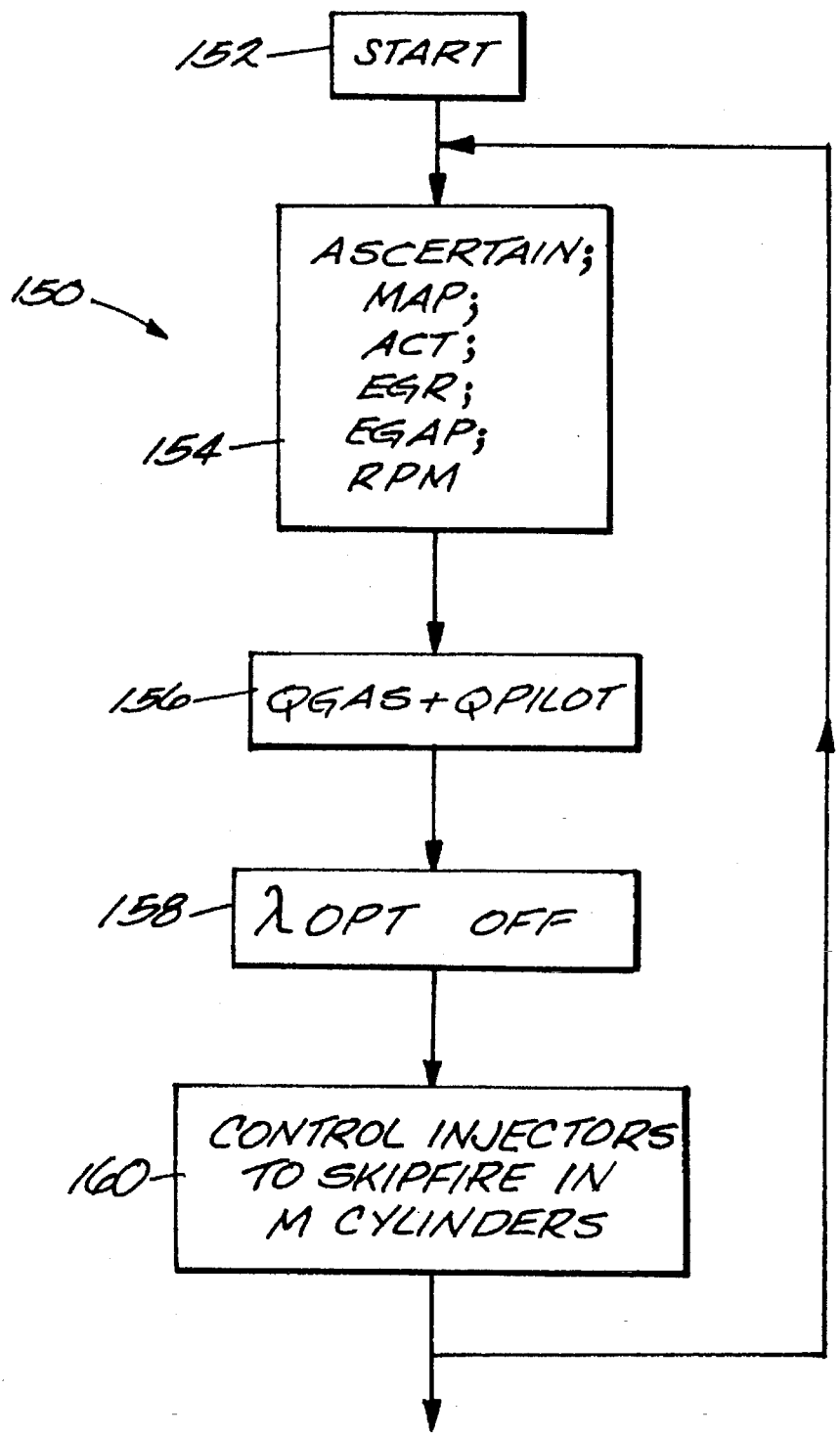
FIG. 13 is a flow chart of a lambda optimization routine performed in accordance with the invention.

Referring now to FIG. 13, OFF is controlled by a routine 150 which proceeds from start at step 152 to step 154 in which data is input from the sensors 80–100, and power demand, MAP, ACT, EGR, EGAP, RPM, and any other engine operating parameters required to calculate OFF and/or $\lambda_{OPT}$ are ascertained either directly from the sensors 80–100 or indirectly using the equations set forth above or from the ECU ROM. The total quantities of primary and pilot fuels $Q_{gas}$ and $Q_{pilot}$ required to supply the required power is then calculated in STEP 156 as described above and in the '445 application. Next, OFF and $\lambda_{OPT}$ are ascertained in step 158 using the appropriate one of the equations (1), (2), (3), or (4), or using a look-up table having the results of these equations stored therein. In the illustrated embodiment in which an egr system is employed having an adjustable-restriction pressure metering orifice 68, one of equations (2) and (4) would be employed. Having determined OFF, it is a simple matter for the routine 150 to determine a number M of the N cylinders 12, the firing of which must be skipped to achieve OFF, at which point the routine 150 proceeds to step 160 where it controls the injectors 32 and 40 to distribute $Q_{gas}$ and $Q_{pilot}$ to the remaining (N–M) cylinders 12 in the appropriate firing order, thereby skipping fueling and firing cycles in the M cylinders 12. Steps 152–160 are repeated on a cycle-by-cycle basis as long as the engine 10 is running. The wastegate 74, turbo bypass 76, metering valve 68, and other engine parameters are also controlled by controller 56 at this time in a known manner.

5. Examples

The following non-limiting examples for a six cylinder engine provide an indication of the typical values of the engine operating parameters used to determine OFF.

a. Example (a), Equation (1):

| | | |
|---|---|---|
| IMEP | = | 1.0 bar, approximately the same as engine idle |
| $IMEP_{max}$ | = | 20 bar, maximum torque |
| $MAP_{max}$ | = | 3.0 bar |
| ACT | = | 330° K., typical for air-to-air aftercooler |
| MAP | = | 1.0, engine idle |
| OFF | = | $\left(\frac{1}{20}\right)\left(\frac{330}{300}\right)\left(\frac{1}{3}\right)^{1/3} \div \frac{1}{3} =$ |
| | | $(0.05)(1.1)(0.69) \div (6.333) = 0.11$ |
| 0.11(6) | = | 0.66 or fire on 1 cylinder. | b. Example (b), Equation (1):

| | | |
|---|---|---|
| IMEP | = | 11, about 50% power |
| $MAP_{max}$ | = | 3.0 bar |
| ACT | = | 330° K. |
| MAP | = | 2.0 |
| OFF | = | $\left(\frac{11}{20}\right)\left(\frac{330}{300}\right)\left(\frac{2}{3}\right)^{1/3} \div$ |
| | | $\left(\frac{2}{3}\right) = 0.789$ |

NOTE: For a cylinder engine at 50% power, conventional wisdom would ordinarily indicate selection of half, or 3, cylinders. Th2 OFF equation selected 0.789(6) = 4.73 or fire on 5 cylinders.

c. Example (c), Equation (2) (same as example (a.) but EGAP=2 and "b"=1.5, engine idle with high EGR):

| | | |
|---|---|---|
| IMEP | = | 1.0 bar |
| $IMEP_{max}$ | = | 20 |
| $MAP_{max}$ | = | 3.0 |
| ACT | = | 450° K. |
| MAP | = | 1.0 |
| EGAP | = | 2 |
| b | = | 1.5; |
| OFF | = | $\frac{1}{20}\left(\frac{450}{300}\right)\left(\frac{1}{3}\right)^{1/3} \div$ |
| | | $\left(\frac{1}{3}\right)\left(\frac{1}{2}\right)^{1.5} = 0.44; 0.44(6) = 2.64$ | or fire on 3 cylinders out of 6.

d. Example (d), Equation (4) (same as Example (c) but add 20% EGR, with exponent "c"=1.0, and $RPM/RPM_{max}$=0.3 with exponent "d"=0.2) and exponent "e"=0:

$$OFF = 2.64\left(1 + \frac{EGR}{M_{TOT}}\right)\left(1 + \frac{RPM}{RPM_{MAX}}\right)^{0.2} =$$

$$2.64(1.2)(1.3)^{0.2} = 3.34$$

e. Example (e), calculation of lambda and application of equation (4):

$$\lambda_{gas} = \rho_{air}(\text{cyl disp})\left(\eta_{vol} - \frac{\text{vol gas}}{\text{cyl disp}}\right) \div Q_{gas}\left(\frac{A}{F}\right) \text{stoich}$$

$$= \rho_{air}\left(\frac{300}{ACT}\right)(MAP)(\text{cyl. disp})\left(\eta_{vol} - \frac{\text{vol gas}}{\text{cyl disp}}\right) \div$$

$$Q_{gas}\left(\frac{A}{F}\right) \text{stoich}$$

For a 6 cylinder, 7.6 liter engine:

| | | |
|---|---|---|
| $\eta_{vol}$ | = | 0.9, $Q_{gas}]_{max} = 100$ mg |
| cyl disp | = | $(7.6 \div 6)(1000) = 1,270$ cm³ |
| $\eta_{vol}$ | = | 0.90 |
| $Q_{gas}$ | = | 50/6 mg/cyl |
| $Q_{gas}]_{max}$ | = | 100 mg |
| vol gas | = | 82.3/6 cm³/cyl |
| MAP | = | 1.0 |
| ACT | = | 300 |
| $\rho_{air}$ | = | 1.10 mg/cc @ ACT = 300° K. and MAP = 1 bar |
| $\rho_{gas}$ | = | 0.607 mg/cc @ ACT = 300° K. and MAP = 1 bar |

$$\lambda_{gas} = (1207)\left(0.9 - \frac{82.3}{6 \times 1207}\right)(1.10)\left(\frac{300}{300}\right)(1.0) \div$$

$$\left(\frac{650}{6}\right)(17) = 8.33$$

Since 50 mg of natural gas is approximately the same energy content as 67 mm³ of diesel fuel and a 7.6 liter engine requires about this energy level for normal idle, the variation of lambda at no load and normal idle with fraction of cylinders firing is reproduced below as Table 2.

TABLE 2

| Fraction of Cylinders Firing | Lambda |
|---|---|
| 6/6 | 8.33 |
| 3/6 | 4.16 |
| 2/6 | 2.78 |
| 1/6 | 1.39 |

For an engine without EGR, since $IMEP/IMEP_{max}$ is approximately the same as $(1/N)(Q_{gas}/Q_{gas}]_{max})$, OFF can be calculated from equation (1):

$$OFF = \left(\frac{1}{6}\right)\left(\frac{50}{100}\right)\left(\frac{300}{300}\right)\left(\frac{1.0}{3}\right)^{0.33} \div \left(\frac{1.0}{2.8}\right) = 0.16$$

6×0.16=0.96 or fire on 1 cylinder.

In many cases, firing on one cylinder out of six may cause excessive vibrations. In such cases EGR and EGAP may be added. For example, with EGR of 5% and EGAP of 1.5 bar, OFF from equation 4 and default value from Table I gives OFF values as follows:

$$\begin{aligned}
OFF &= \left(\frac{1}{6}\right)\left(\frac{50}{100}\right)\left(\frac{300}{300}\right)\left(\frac{1}{3}\right)^{0.33}(1+\\
&\quad 0.05)\left(1+\frac{700}{2400}\right) \div \left(\frac{1.0}{2.8}\right)\left(\frac{1.0}{1.5}\right) \\
&= (0.083)(0.69)(1.05)(1.29) \div (0.357)(0.67) \\
&= 0.324. \\
0.324(6) &= 1.94 \text{ or fire on 2 cylinders.}
\end{aligned}$$

The EGR and EGAP will result in a decrease in lambda caused by an increase in residual exhaust gasses and increased fuel flow required to satisfy the increased parasitic load from EGAP.

6. Generalized Relationship Between BSNOx, Lambda and Ignition Timing

Figure 12:
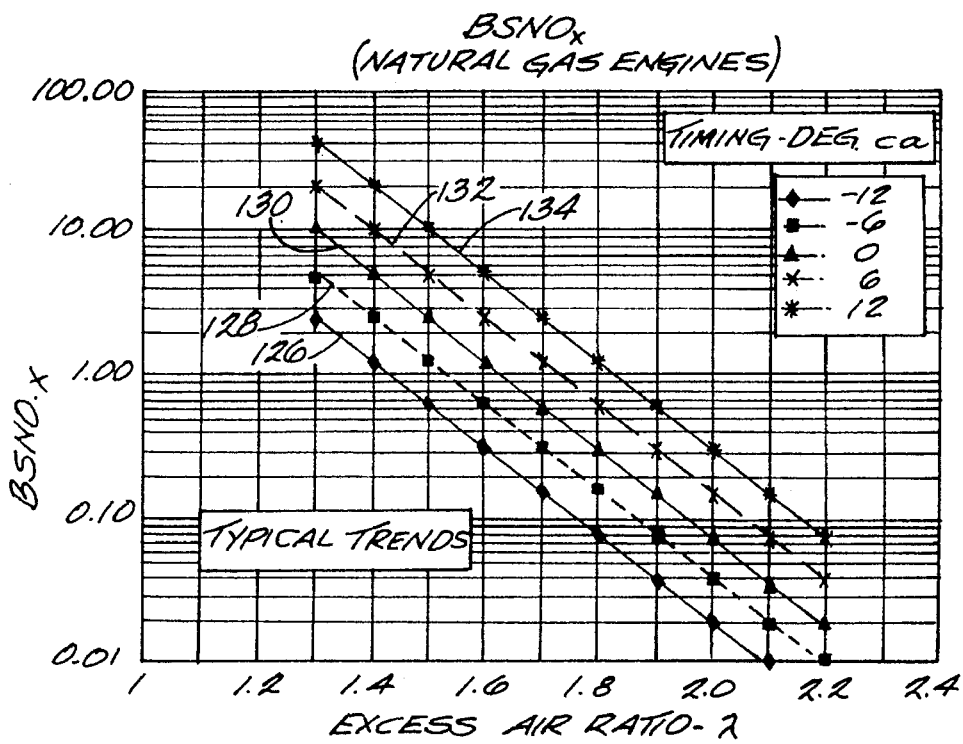
FIG. 12 is a graph illustrating the effects of changes in ignition timing and lambda on NOx emisions.

Using a composite of engine test data as shown in FIG. 12, an empirical relationship between brake specific NOx, lambda and ignition timing can be derived for the range of lambda of 1.4 to 2.4 with results as follows:

$BSNOx = Ke^{(x+y)}$ where:
$x = a(b-\lambda)$;
$y = c(\theta-d)$;
$\lambda$ = excess air ratio;
$\theta$ = deg BTDC;
$a = 6.93$;
$b = 1.5$;
$c = (0.693/6)$;
$d = 6$; and
$K_{nominal} = 5$.

K is dependent upon many engine specific factors as reproduced below in Table 3.

TABLE 3

| Item | Nominal Value |
|---|---|
| ACT | 330° K. |
| MAP | 2 bar |
| CR | 12 |
| RPM | 1200/min |
| BMEP | 12 bar |
| EGR | None |

An empirical value of $K_{nominal}$ is 5.0 g/hp-hr. This value can be adjusted to normalize the equation, but the basic trends generally will remain as predicted by the BSNOx equation. BSNOx vs. $\lambda$ at constant ignition timing are plotted by the curves 126–134 in FIG. 12 and discussed above.

An example will demonstrate the relationship between timing, lambda, and BSNOx.

For a nominal engine with lambda=1.6 and $\theta=0°$BTDC:
$BSNOx = Ke^{(x+y)}$;
$K_{nominal} = 5.0$;
$x = 6.93(1.5-1.6)$; and
$y = (0.693/6)(0-6)$;
$BSNOx = 5e^{-0.693-0.693} = 5(\frac{1}{2})(\frac{1}{2}) = 1.25$ g/hp-hr.

This example shows that BSNOx is reduced by 50% for each 0.1 increase in lambda and for each 6 degrees retard ignition timing.

Figure 14:
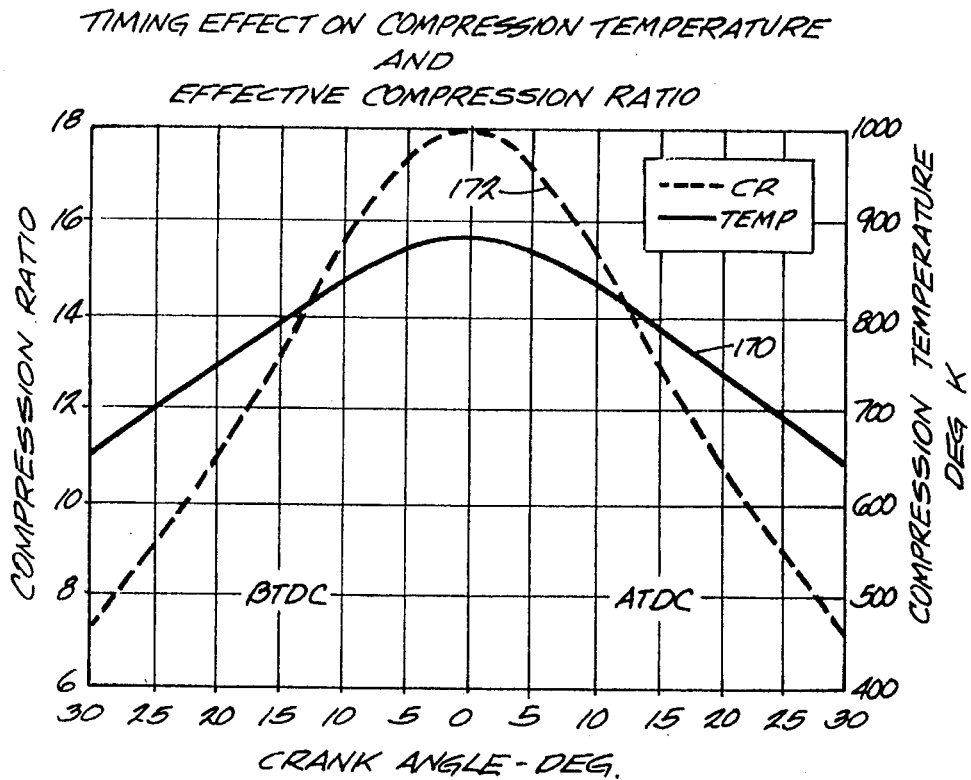
FIG. 14 is a graph illustrating the effects of changes in ignition timing on effective compression ratio and compression temperature.

7. Retarded Ignition Timing to Control Effective Compression Ratio, Detonation and Lambda In order to comply with current and future exhaust emission levels, diesel engines have been developed to operate satisfactorily with retarded injection and ignition timing, sometimes as late as a few degrees after top dead center. Post-TDC timing requires the utmost in effective and fast ignition and combustion and is very effective in reducing NOx emissions. NOx emissions are typically cut in half for each 6 degrees of ignition retard. Moreover, temperatures in the unfired cylinders decrease (see curve 170 in FIG. 14). This after TDC feature can be used very effectively to reduce NOx emissions in compression ignition gas fueled engines. Moreover, since the compression pressure and temperature of an unfired cylinder decreases after top dead center, so also is the effective compression ratio reduced as shown by the curve 172 in FIG. 14. If the effective compression ratio is reduced, so also is the detonation limit at a given lambda, ACT and MAP. Consequently, if OPT is limited by detonation, ignition timing variation offers an alternative to adjusting or retaining optimum lambda.

8. Fine Control of Lambda

Using skip fire for lambda adjustment can obviously be applied only in discrete whole numbers of firing cylinders. The precision of lambda control by skip fire alone is therefore limited. However, since lambda is affected by ignition timing, EGR, and MAP, variations in ignition timing, EGR, and MAP can be used in combination with skip fire to optimize and trim operation with more precision. Examples follow of fine tuning by EGR and MAP control.

a. MAP control

Variations in MAP obviously result in accompanying variations in the amount of air admitted to the intake manifold and accompanying variations in lambda. MAP can be adjusted for optimum lambda control through suitable control of turbo air bypass valve 76 (FIGS. 7a–9), which may comprise a variable flow metering orifice identical in construction to valve 68. One technique for obtaining this goal is, after selecting OFF as described above and controlling the engine accordingly, to 1) calculate $\lambda_{ACT}$, and 2) control the valve 76 to vary an amount of turbo air bypass to make $\lambda_{ACT}$ approach $\lambda_{OPT}$, and 3) repeat steps 1) and 2) in an iterative feed-back process until $\lambda_{ACT}$ equals $\lambda_{OPT}$. Only a few such iterations should be required, because $\lambda_{ACT}$ will be near $\lambda_{OPT}$ after skip fire control is completed.

Figure 15:
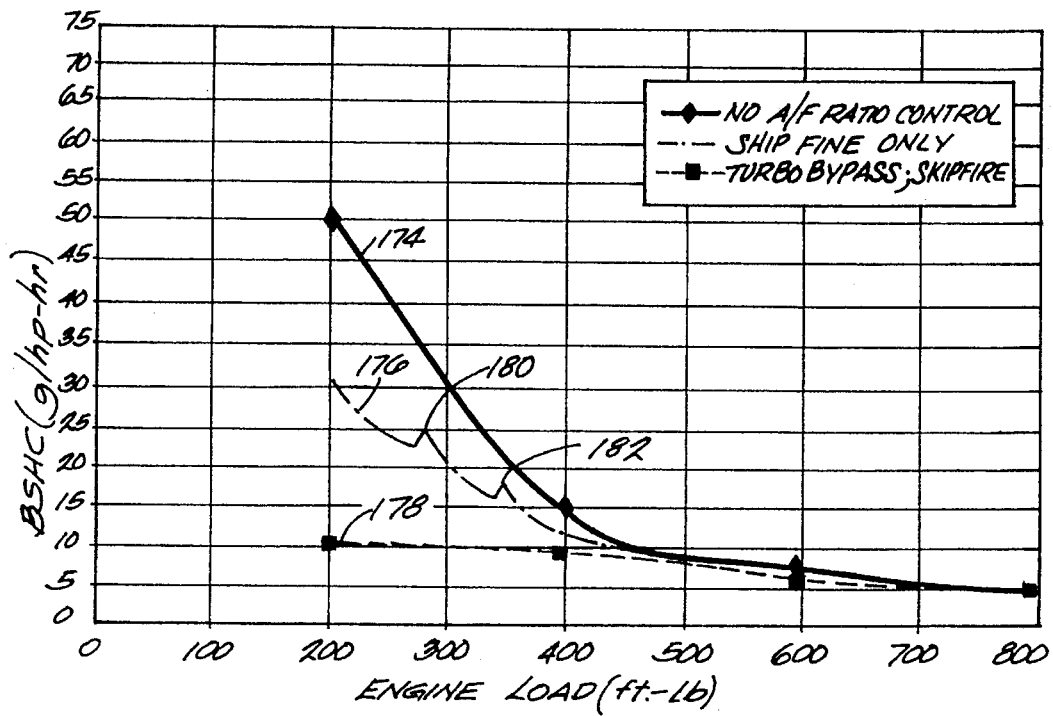
FIG. 15 is a graph illustrating the combined effects of skip fire and turbo air bypass on engine performances as measured by BSHC.

The effects of this fine tuning are illustrated in FIG. 15 which show the effects of skip fire, with and without turbo air bypass control, on the performance of a Caterpillar model 3176B engine as measured by brake specific hydrocarbons (BSHCs). As one would expect, curve 174 illustrates that BSHCs are very high under low-load conditions in the absence of any lambda control but, as illustrated by curve 176, decrease dramatically under the use of the skip fire routine described above. The spikes 180 and 182 in this curve illustrate the discrete nature of control by skip fire only, with engine performance decreasing when the OFF is actually between two cylinders. For instance point 180 may represent a performance point when OFF is actually about 0.25, about half way between one and two cylinders firing. The curve 178 illustrates that these inefficiencies can be alleviated by the additional control of MAP through suitable operation of turbo air bypass valve 76.

b. egr Control

Exhaust gas recirculation, which permits a controlled amount of recirculated exhaust gases to flow from the exhaust manifold to the air intake manifold, provides another means to control lambda precisely.

Figure 16:
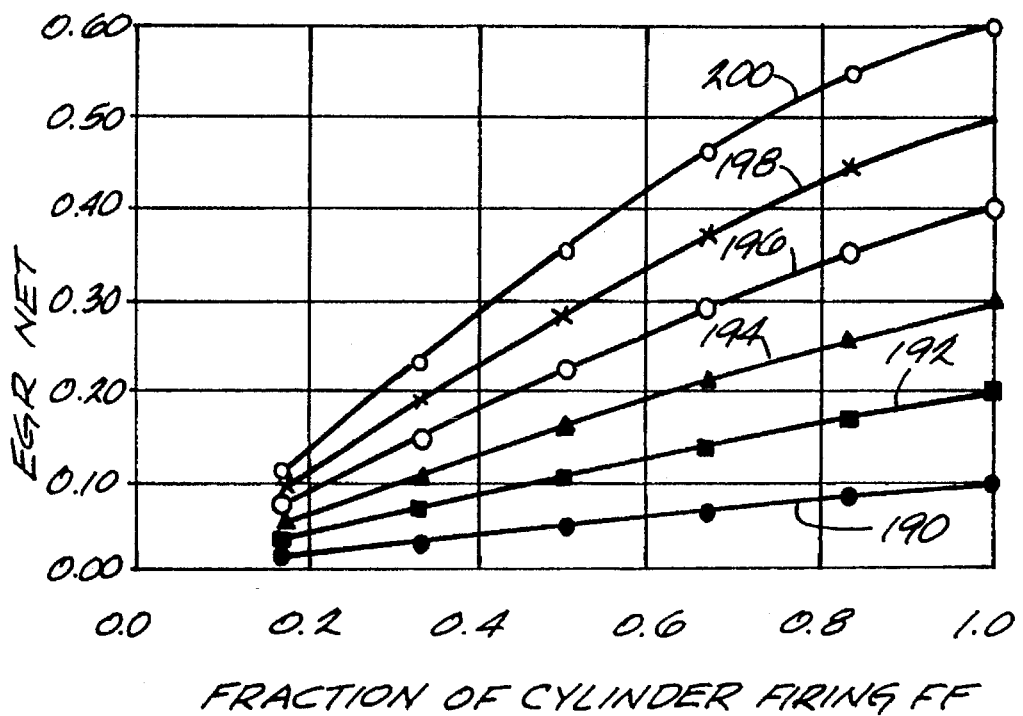
FIG. 16 is a graph illustrating the relationship between $EGR_{gross}$, fraction of cylinders firing an $EGR_{net}$.

When skip-fire and EGR are employed at the same time, fresh air is actually being recirculated from non-firing cylinders to the air intake manifold, together with the burnt gases. Therefore, the mass of burnt gases within the total recirculated exhaust gas fraction ($EGR_{net}$), is less than the mass of total recirculated exhaust gas fraction ($EGR_{gross}$). The difference of these in relation to the fraction of cylinder firing (FF), is shown in FIG. 16. These curves demonstrate that the $EGR_{net}$ is very much less than the $EGR_{gross}$ when the FF is small (curves 190, 192, and 194), especially with increase $EGR_{gross}$ (curves 198 and 200).

It is possible to calculate the actual value of lambda ($\lambda_{ACT}$), based on the $EGR_{net}$ and the optimum fraction of cylinders firing (OFF), and to obtain an optimum value of lambda ($\lambda_{OPT}$) by adjusting $EGR_{net}$. Therefore, controlling the mass total recirculated exhaust gas fraction ($EGR_{gross}$) can be used effectively in combination with skip-fire to obtain $\lambda_{OPT}$ with more precision.

The following equations are used to calculate the actual value of lambda ($\lambda_{ACT}$):

$$M_{TOT} = \rho_{air} \left( \frac{300}{ACT} \right) (MAP)(\text{cyl disp}) \left( \eta_{vol} - \frac{\text{vol gas}}{\text{cyl disp}} \right) \quad \text{(Eq. 6)}$$

where $M_{TOT}$ is the total air and recirculated exhaust gases charge, mg/cycle/cyl; and neglecting the density difference of air and recirculated exhaust gases.

$$\lambda_{ACT} = (FF) \left( \frac{M_{TOT} \cdot A}{A + EGR_{net}} \right) \left\{ 1 + (EGR_{net}) \left( \frac{1 - EGR_{net}}{A} - 1 \right) \right\} \div \left( Q_{gas} \cdot \left( \frac{A}{F} \right) \text{stoich} \right) \quad \text{(Eq. 7)}$$

where $FF = 1 - \left( \dfrac{\text{No. of non-firing cylinders } (M)}{\text{No. of cylinders } (N)} \right)$;

$M = N(1\text{-OFF})$, (rounded to a discrete whole number);

and $A = (FF)(1 - EGR_{net}) - (EGR_{net})(1 - FF)^2$ $(1 - EGR_{gross})(EGR_{net}) = (A)(EGR_{gross})$.

Once $\lambda_{ACT}$ is calculated, it is a simple matter to adjust the setting of the eqr valve 68 to make $\lambda_{ACT} = \lambda_{OPT}$ using a simple interative closed-loop feedback process.

Many modifications may be made within the present invention without departing from the spirit thereof. For instance, the invention is also equally applicable to spark ignition engines. The scope of these and other changes will become apparent from the appended claims.

We claim:

1. A method of optimizing the excess air ratio ($\lambda$) for a gaseous fuel-powered internal combustion engine, said engine having a number (N) of cylinders, said method comprising:

(A) ascertaining prevailing engine operating conditions;

(B) determining, based upon said prevailing engine operating conditions, an optimum fraction of cylinders (OFF) required to be fired to cause an actual value of $\lambda$ to at least approach an optimum value of $\lambda$ ($\lambda_{OPT}$); then (C) determining a number (M) of cylinders that the firing of which must be skipped to produce said OFF, M being less than N; and then (D) eliminating a firing and fueling cycle in said M number of cylinders only.

2. A method as defined in claim 1, wherein said engine has an intake manifold, and wherein step (B) comprises:

(1) ascertaining
        (a) a prevailing indicated mean effective pressure (IMEP),
        (b) a maximum indicated mean effective pressure ($IMEP_{MAX}$),
        (c) an air charge temperature (ACT) of an ambient air charge admitted to said intake manifold,
        (d) a prevailing intake manifold absolute pressure (MAP),
        (e) a maximum intake manifold absolute pressure ($MAP_{MAX}$), and (f) an empirically derived exponent (a) weighing the effects of changes in said MAP on the performance of said engine; and then (2) calculating said OFF according to the equation:

$$\text{OFF} = \left(\frac{IMEP}{IMEP_{MAX}}\right)\left(\frac{ACT}{300}\right)\left(\frac{MAP}{2}\right)^a \div \left(\frac{MAP}{MAP_{MAX}}\right).$$

3. A method as defined in claim 2, wherein said exponent "a" has a value between 0.2 and 0.5.

4. A method as defined in claim 1, wherein
said engine is a turbocharged engine which includes an intake manifold, a turbocharger, and an aftercooler and in which recirculated exhaust gases (EGR) flow, under the control of an adjustable flow-restricting metering orifice, to an intake port located in said intake manifold downstream of said aftercooler and wherein said step (B) comprises
(1) ascertaining
   (a) a prevailing indicated mean effective pressure (IMEP),
   (b) a maximum indicated mean effective pressure ($IMEP_{MAX}$),
   (c) an air charge temperature (ACT) of an ambient air charge admitted to said intake manifold,
   (d) a prevailing intake manifold absolute pressure (MAP),
   (e) a maximum intake manifold absolute pressure ($MAP_{MAX}$),
   (f) a first empirically derived exponent (a) weighing the effects of changes in said MAP on the performance of said engine, and
   (g) a second empirically derived exponent (b) relating to a flow coefficient of said metering orifice, and
   (h) a value EGAP determined according to the equation: EGAP=MAP+EBP+φ, where EBP is an ascertained pressure drop across said metering orifice and φ is an empirical factor dependent upon the construction of said turbocharger and having a value of between −0.5 bar and 0.5 bar; and then
(2) calculating said OFF according to the equation:

$$\text{OFF} = \left(\frac{IMEP}{IMEP_{MAX}}\right)\left(\frac{ACT}{300}\right)\left(\frac{MAP}{2}\right)^a \div \left(\frac{MAP}{MAP_{MAX}}\right)\left(\frac{MAP}{EGAP}\right)^b.$$

5. A method as defined in claim 4, wherein said exponent "a" has a value between 0.2 and 0.5 and said exponent "b" has a value between 0 and 2.

6. A method as defined in claim 1, wherein said engine is a turbocharged engine which includes an intake manifold, a turbocharger, and an aftercooler and in which recirculated exhaust gases (EGR) flow to an intake port located in said intake manifold downstream of said aftercooler, and wherein said steps (A) and (B) comprise
(1) ascertaining
   (a) a prevailing indicated mean effective pressure (IMEP),
   (b) a maximum indicated mean effective pressure ($IMEP_{MAX}$),
   (c) an air charge temperature (ACT) of an ambient air charge admitted to said intake manifold,
   (d) a prevailing intake manifold absolute pressure (MAP),
   (e) a maximum intake manifold absolute pressure ($MAP_{MAX}$),
   (f) an exhaust gas absolute pressure (EGAP),
   (g) a first empirically derived exponent (a) weighing the effects of changes in said MAP on the performance of said engine,
   (h) a mass of total mixture ($M_{TOT}$) admitted to said intake manifold,
   (i) a value equal to a fraction by mass of said EGR to said total mixture ($M_{TOT}$);
   (j) a second empirically derived exponent (c) weighing the effects of changes in said EGR on the performance of said engine; and then
(2) calculating said OFF according to the equation:

$$\text{OFF} = \left(\frac{IMEP}{IMEP_{MAX}}\right)\left(\frac{ACT}{300}\right)\left(\frac{MAP}{2}\right)^a \div \left(\frac{MAP}{MAP_{MAX}}\right).$$

7. A method as defined in claim 6, wherein said exponent "a" has a value between 0.2 and 0.5 and said exponent "c" has a value between 0.0 and 2.0.

8. A method as defined in claim 1, wherein said engine is a turbocharged engine which includes an intake manifold, a turbocharger, and an aftercooler and in which recirculated exhaust gases (EGR) flow under the control of an adjustable flow-restricting metering orifice to an intake port of said intake manifold located downstream of said aftercooler, and wherein said steps (A) and (B) comprise
(1) ascertaining
   (a) a prevailing indicated mean effective pressure (IMEP),
   (b) a maximum indicated mean effective pressure ($IMEP_{MAX}$),
   (c) an air charge temperature (ACT) of an ambient air charge admitted to said intake manifold,
   (d) a prevailing intake manifold absolute pressure (MAP),
   (e) a maximum intake manifold absolute pressure ($MAP_{MAX}$),
   (f) an exhaust gas absolute pressure (EGAP),
   (g) a mass of total mixture ($M_{TOT}$) admitted to said intake manifold,
   (h) a value equal to a fraction by mass of said EGR to said total mixture $M_{TOT}$,
   (i) a value EGAP determined according to the equation: EGAP=MAP+EBP+φ, where EBP is an ascertained pressure drop across said metering orifice and φ is an empirical factor dependent upon the construction of said turbocharger and having a value of between −0.5 bar and 0.5 bar,
   (j) a prevailing engine speed (RPM),
   (k) a maximum engine speed ($RPM_{MAX}$),
   (l) a first empirically derived exponent (a) weighing the effects of changes in said MAP on the performance of said engine,
   (m) a second empirically derived exponent (b) relating to a flow coefficient of said metering orifice,
   (n) a third empirically derived exponent (c) weighing the effects of changes in said EGR on the performance of said engine,
   (o) a fourth empirically derived exponent (d) weighing the effects of changes in said RPM on the performance of said engine, (p) a fifth empirically derived exponent (e), weighing the effects of changes in said ACT on the performance of said engine; and then (2) calculating said OFF according to the equation:

$$OFF = \left(\frac{IMEP}{IMEP_{MAX}}\right)\left(\frac{ACT}{300}\right)^{1+e}\left(\frac{MAP}{3}\right)^{a}\left(1+\frac{EGR}{M_{TOT}}\right)^{c}\left(1+\frac{RPM}{RPM_{MAX}}\right)^{d} \div \frac{MAP}{MAP_{MAX}}\left(\frac{MAP}{EGAP}\right)^{b}$$

9. A method as defined in claim 8, wherein said exponent "a" has a value between 0.2 and 0.5, said exponent "b" has a value between 0 and 2, said exponent "c" has a value between 0.0 and 2.0, said exponent "d" has a value between 0.0 and 0.4, and said exponent "e" has a value between 0 and 0.5.

10. A method as defined in claim 1, wherein said step (B) is performed without taking into account engine speed, ignition timing, or effects of exhaust gas recirculation to said intake port.

11. A method as defined in claim 1, wherein said step (B) is performed based in part upon a detected prevailing engine speed.

12. A method as defined in claim 1, wherein said step (B) is performed based in part upon a known prevailing ignition timing.

13. A method as defined in claim 1, wherein exhaust gases are recirculated to an intake manifold of said engine, and wherein said step (B) is performed based in part upon an ascertained prevailing fraction by mass of recirculated exhaust gases to a value $M_{TOT}$, where $M_{TOT}$ is a mass of total mixture admitted to an intake manifold of said engine.

14. A method as defined in claim 1, wherein said step (B) comprises first ascertaining said prevailing engine operating conditions and then determining said OFF using a look-up table.

15. A method as defined in claim 1, wherein said steps (A)–(D) are repeated on a cycle-by-cycle basis.

16. A method as defined in claim 1, further comprising adjusting said λ to more closely equal $\lambda_{OPT}$ by adjusting an engine operating parameter.

17. A method as defined in claim 16, wherein said adjusting step comprises varying manifold absolute pressure, thereby varying the amount air inducted into said engine.

18. A method as defined in claim 17, wherein said adjusting step comprises adjusting the position of a turbo air bypass valve.

19. A method as defined in claim 16, wherein said adjusting step comprises adjusting a percentage of recirculated exhaust gases supplied to an intake manifold of said engine.

20. A method of optimizing the excess air ratio (λ) for a gaseous fuel-powered internal combustion engine, said engine having a number (N) of cylinders, said method comprising:

(A) ascertaining prevailing engine operating conditions;

(B) determining, based upon said prevailing engine operating conditions, an optimum fraction of cylinders (OFF) required to be fired to cause an actual value of λ to at least approach an optimum value of λ ($\lambda_{OPT}$); then (C) determining a number (M) of cylinders that the firing of which must be skipped to produce said OFF, M being less than N; and then (D) eliminating a firing and fueling cycle in said M number of cylinders only; and then (E) adjusting said λ to more closely equal $\lambda_{OPT}$ by adjusting at least one engine operating parameter.

21. A method as defined in claim 20, wherein said adjusting step comprises varying manifold absolute pressure, thereby varying the amount of air inducted into said engine.

22. A method as defined in claim 21, wherein said adjusting step comprises adjusting the position of a turbo air bypass valve.

23. A method as defined in claim 20, wherein said adjusting step comprises adjusting a percentage of recirculated exhaust gases supplied said engine.

24. A method of optimizing the excess air ratio (λ) for a gaseous fuel-powered internal combustion engine, said engine having a number (N) of cylinders, said method comprising, on a cycle-by-cycle basis:

(A) ascertaining engine operating conditions including
 (a) a prevailing indicated mean effective pressure (IMEP),
 (b) an air charge temperature (ACT) of an ambient air charge admitted to said intake manifold, and
 (c) a prevailing intake manifold absolute pressure (MAP); then (B) determining, based upon said engine operating conditions, an optimum fraction of cylinders (OFF) required to be fired to cause an actual value of λ to at least approach an optimum value of λ ($\lambda_{OPT}$); then (C) determining a number (M) of cylinders the firing of which must be skipped to produce said OFF, M being less than N; and then (D) eliminating a firing and fueling cycle in said M number of cylinders only.

25. A method as defined in claim 24, wherein said engine is a turbocharged engine which includes an intake manifold, a turbocharger, and an aftercooler and in which recirculated exhaust gases (EGR) flow, under the control of an adjustable flow-restricting metering orifice, to an intake port located in said intake manifold downstream of said aftercooler, wherein said step (A) further comprises ascertaining a value EGAP determined according to the equation: EGAP=MAP+EBP+ϕ, where EBP is an ascertained pressure drop across said metering orifice and ϕ is an empirical factor dependent upon the construction of said turbocharger and having a value of between −0.5 bar and 0.5 bar, and wherein said step (B) is performed on the basis of said EGAP.

26. A method as defined in claim 24, wherein said engine is a turbocharged engine which includes an intake manifold, a turbocharger, and an aftercooler and in which recirculated exhaust gases (EGR) flow from an exhaust port to an intake port located in said intake manifold downstream of said aftercooler, wherein said step (A) further comprises ascertaining a fraction of EGR flow into said intake port as a function of total flow of gases into said intake manifold, and wherein said step (B) is performed on the basis of said fraction.

27. A method as defined in claim 24, wherein said step (A) further comprises ascertaining a prevailing engine speed (RPM), and wherein said step (B) is performed based upon said RPM.

28. An internal combustion engine comprising:

(A) a number N of cylinders;

(B) a gaseous fuel injection system associated with said cylinders;

(C) an intake manifold cooperating with each of said cylinders; and (D) a control system which controls the operation of said engine, said control system including
  (1) a plurality of sensors, each of which monitors an engine operating condition,
  (2) means, responsive to said sensors, for determining an optimum fraction of cylinders (OFF) required to be fired to cause an actual value of an excess air ratio ($\lambda$) to at least approach an optimum value of $\lambda$ ($\lambda_{OPT}$),
  (3) means for determining a number (M) of cylinders, the firing of which must be skipped to produce said OFF, M being less than N, and
  (4) means for controlling said engine to eliminate a firing and fueling cycle in said M number of cylinders only.

29. An engine as defined in claim 28, wherein said sensors monitor:

(a) a prevailing indicated mean effective pressure (IMEP), (b) an air charge temperature (ACT) of an ambient air charge admitted to said intake manifold, (c) a prevailing intake manifold absolute pressure (MAP); and wherein said means for determining OFF calculates said OFF according to the equation:

$$OFF = \left(\frac{IMEP}{IMEP_{MAX}}\right)\left(\frac{ACT}{300}\right)\left(\frac{MAP}{3}\right)^a \div \left(\frac{MAP}{MAP_{MAX}}\right)$$

wherein $IMEP_{MAX}$=a maximum indicated mean effective pressure, $MAP_{MAX}$=a maximum intake manifold absolute pressure, and "a" is an empirically derived exponent weighing effects of changes in said MAP on the performance of said engine.

30. An engine as defined in claim 28, further comprising:

a turbocharger;

an aftercooler, an intake being port located in said intake manifold downstream from said aftercooler;

means for permitting recirculated exhaust gases (EGR) to flow to said intake port; and means for controlling the flow of EGR through said means for permitting, said means for controlling including a flow restricting valve having an adjustable flow-restricting metering orifice, wherein said step (B) comprises monitoring:
  (a) a prevailing indicated mean effective pressure (IMEP),
  (b) an air charge temperature (ACT) of an ambient air charge admitted to said intake manifold,
  (c) a prevailing intake manifold absolute pressure (MAP), and
  (d) a prevailing pressure drop (EBP) across said metering orifice; and wherein said means for determining calculates said OFF according to the equation:

$$OFF = \left(\frac{IMEP}{IMEP_{MAX}}\right)\left(\frac{ACT}{300}\right)\left(\frac{MAP}{3}\right)^a \div \left(\frac{MAP}{MAP_{MAX}}\right)\left(\frac{MAP}{EGAP}\right)^b$$

wherein $IMEP_{MAX}$=a maximum indicated mean effective pressure, $MAP_{MAX}$=a maximum intake manifold absolute pressure, "a" is a first empirically derived exponent relating to the effects of changes in said MAP on the performance of said engine, "b" is a second empirically derived exponent relating to a flow coefficient of said metering orifice, and EGAP is determined according to the equation: EGAP= MAP+EBP+$\phi$, where $\phi$ is an empirical factor dependent upon the construction of said turbocharger and having a value of between −0.5 bar and 0.5 bar.

31. An engine as defined in claim 28, further comprising a turbocharger;

an aftercooler, an intake port being formed in said intake manifold at a location downstream of said aftercooler; and means for permitting recirculated exhaust gases (EGR) to flow, in the absence of an adjustable flow-restricting metering orifice, to said intake port, said means for permitting including a flow restricting valve having an adjustable flow-restricting metering orifice, wherein said means (B) comprises ascertaining
  (a) a prevailing indicated mean effective pressure (IMEP),
  (b) an air charge temperature (ACT) of an ambient air charge admitted to said intake manifold,
  (c) a prevailing intake manifold absolute pressure (MAP), and
  (d) a mass of total mixture ($M_{TOT}$) admitted to said intake manifold; and wherein said means for determining calculates said OFF according to the equation:

$$OFF = \left(\frac{IMEP}{IMEP_{MAX}}\right)\left(\frac{ACT}{300}\right)\left(\frac{MAP}{3}\right)^a \left(1+\frac{EGR}{M_{TOT}}\right)^c \div \left(\frac{MAP}{MAP_{MAX}}\right)$$

wherein $IMEP_{MAX}$=a maximum indicated mean effective pressure, $MAP_{MAX}$=a maximum intake manifold absolute pressure, "a" is a first empirically derived exponent weighing the effects of changes in said MAP on the performance of said engine, $M_{TOT}$=a value equal to a fraction by mass of said EGR to said total mixture, and "c" is a second empirically derived exponent weighing the effects of changes in said EGR on the performance of said engine.

32. An internal combustion engine comprising:

(A) a number N of cylinders;

(B) a gaseous fuel injection system associated with said cylinders;

(C) an intake manifold cooperating with each of said cylinders; and (D) a control system which controls the operation of said engine, said control system including (1) a plurality of sensors monitoring
  (a) a prevailing indicated mean effective pressure (IMEP),
  (b) an air charge temperature (ACT) of an ambient air charge admitted to said intake manifold, and
  (c) a prevailing intake manifold absolute pressure (MAP);
(2) means, responsive to said sensors, for determining an optimum fraction of cylinders (OFF) required to be fired to cause an actual value of λ to at least approach an optimum value of λ ($\lambda_{OPT}$),
(3) means for determining a number (M) of cylinders the firing of which must be skipped to produce said OFF, M being less than N, and
(4) means for controlling, on a cycle-by-cycle basis, said engine to eliminate a firing and fueling cycle in said M number of cylinders only.

33. An engine as defined in claim 32, further comprising:

a turbocharger;

an aftercooler, an intake port being located in said intake manifold downstream from said aftercooler;

means for permitting recirculated exhaust gases (EGR) to flow to said intake port; and means for controlling the flow of EGR through said means for permitting, said means for permitting including a flow restricting valve having an adjustable flow-restricting metering orifice; and wherein said sensors further monitor a pressure drop (EBP) across said metering orifice.

34. An engine as defined in claim 32, further comprising:

a turbocharger;

an aftercooler, an intake port being located in said intake manifold downstream from said aftercooler; and means for permitting recirculated exhaust gases (EGR) to flow, in the absence of an adjustable flow-restricting metering orifice, to said intake port; and wherein said sensors further monitor a mass of total mixture ($M_{TOT}$) admitted to said intake manifold.

* * * * *

UNITED STATES PATENT AND TRADEMARK OFFICE
CERTIFICATE OF CORRECTION

PATENT NO. : 5,553,575
DATED : September 10, 1996
INVENTOR(S) : Beck et al.

It is certified that error appears in the above-identified patent and that said Letters Patent is hereby corrected as shown below:

Column 11, Line 48, delete "so" and insert --$\phi$--.
Column 13, Line 61, after "a" insert --6--; and Line 62, delete "Th2" and insert --The--.
Column 20, Line 20-21, delete the equation and insert the follwing equation below:

$$OFF = \left(\frac{IMEP}{IMEP_{MAX}}\right)\left(\frac{ACT}{300}\right)\left(\frac{MAP}{3}\right)^a \left(1 + \frac{EGR}{M_{TOT}}\right)^c \div \left(\frac{MAP}{MAP_{MAX}}\right).$$

Signed and Sealed this

Third Day of December, 1996

Attest:

BRUCE LEHMAN

Attesting Officer         Commissioner of Patents and Trademarks